United States Patent [19]
Gosselin et al.

[11] Patent Number: 6,094,453
[45] Date of Patent: Jul. 25, 2000

[54] DIGITAL DATA COMPRESSION WITH QUAD-TREE CODING OF HEADER FILE

[75] Inventors: Todd N. Gosselin; George Georgiadis, both of Regina, Canada

[73] Assignee: Digital Accelerator Corporation, Vancouver, Canada

[21] Appl. No.: 08/783,340

[22] Filed: Jan. 16, 1997

Related U.S. Application Data

[60] Provisional application No. 60/028,273, Oct. 11, 1996.

[51] Int. Cl.[7] .................................................. H04N 7/24
[52] U.S. Cl. ............................ 375/240; 348/420; 382/232
[58] Field of Search .................................... 348/384, 390, 348/400, 401, 402, 409, 415, 416, 420; 382/232, 233, 236, 238; 375/240

[56] References Cited

U.S. PATENT DOCUMENTS

| | | | |
|---|---|---|---|
| 4,301,469 | 11/1981 | Modeen et al. | 358/539 |
| 4,520,506 | 5/1985 | Chan et al. | 382/242 |
| 4,596,039 | 6/1986 | Mitchell et al. | 382/233 |
| 4,606,068 | 8/1986 | Habitzreiter et al. | 382/246 |
| 4,626,829 | 12/1986 | Hauck | 341/63 |
| 4,646,134 | 2/1987 | Komatsu et al. | 348/391 |
| 4,654,877 | 3/1987 | Shimoni et al. | 382/236 |
| 4,754,492 | 6/1988 | Malvar | 382/268 |
| 4,764,975 | 8/1988 | Inoue | 382/299 |
| 4,788,598 | 11/1988 | Ochi et al. | 359/429 |
| 4,797,944 | 1/1989 | Tanaka | 382/246 |
| 4,816,914 | 3/1989 | Ericsson | 348/405 |
| 4,847,677 | 7/1989 | Music et al. | 348/391 |
| 4,899,394 | 2/1990 | Lee | 382/176 |
| 4,901,363 | 2/1990 | Toyokawa | 382/239 |
| 4,920,414 | 4/1990 | Remus et al. | 348/406 |
| 4,939,583 | 7/1990 | Tsuboi et al. | 358/261.1 |
| 4,947,447 | 8/1990 | Miyaoka et al. | 382/246 |
| 5,007,102 | 4/1991 | Haskell | 382/238 |
| 5,008,949 | 4/1991 | Arimoto | 382/233 |
| 5,008,951 | 4/1991 | Koshi | 382/245 |
| 5,016,009 | 5/1991 | Whiting et al. | 341/67 |
| 5,022,088 | 6/1991 | Hisada et al. | 382/235 |
| 5,031,038 | 7/1991 | Guillemot et al. | 348/403 |
| 5,033,105 | 7/1991 | Atkinson | 382/245 |

(List continued on next page.)

OTHER PUBLICATIONS

*Compression With Reversible Embedded Wavelets*, Aug. 1, 1996, http://www.crc.ricoh.com/CREW/CREW.html.
*Compression Publications*, Aug. 1, 1996, http://www.crc.ricoh.com/Pub/Pub.compression.html#crew.
*CREW Summary*, Aug. 1, 1996, http://www.crc.ricoh.com/CREW/CREW.Summary.html.
*Frequently Asked Questions About HARC–C*, Aug. 1, 1996, http://www.harc.edu/Q&A.html.
*About HARC–C*, Aug. 1, 1996, http://www.harc.edu/HARC-C_about.html.
*HARC–C Leadership*, Aug. 1, 1996, http://www.harc.edu/harc_c_leaders.html.
*Information Technology*, Aug. 1, 1996, http://www.harc.edu/infotech.html.

(List continued on next page.)

Primary Examiner—Bryan Tung
Attorney, Agent, or Firm—Brinks Hofer Gilson & Lione

[57] ABSTRACT

A system and method for digital live video transmission is disclosed. According to the system, live or full-motion video is transmitted over plain old telephone system ("POTS") wiring. Successive frames of a video image are captured or received in a source computer, and are then processed prior to transmission. A destination computer reverses the process after the image is received. Quad-tree encoding techniques are preferably employed. A unique YUV pixel representation scheme is used where the pixel data is truncated for further compression. Proportional dithering is applied to smooth the received image, which is preferably displayed on a video screen. Approximately 30 frames per second of video data is transmitted synchronously over twisted pair wiring at currently achievable baud rates.

26 Claims, 10 Drawing Sheets

Microfiche Appendix Included
(2 Microfiche, 133 Pages)

Proportional Dither

Original Image

Proportional Dither

Proportional Dithered Image

U.S. PATENT DOCUMENTS

| | | | |
|---|---|---|---|
| 5,034,741 | 7/1991 | Barzach | 341/67 |
| 5,038,389 | 8/1991 | Mizuno | 382/248 |
| 5,038,390 | 8/1991 | Chandran | 382/248 |
| 5,043,809 | 8/1991 | Shikakura et al. | 348/405 |
| 5,045,852 | 9/1991 | Mitchell et al. | 341/51 |
| 5,046,119 | 9/1991 | Hoffert et al. | 382/166 |
| 5,046,122 | 9/1991 | Nakaya et al. | 382/245 |
| 5,048,111 | 9/1991 | Jones et al. | 382/248 |
| 5,051,840 | 9/1991 | Watanabe et al. | 358/433 |
| 5,054,103 | 10/1991 | Yasuda et al. | 382/250 |
| 5,058,186 | 10/1991 | Miyaoka et al. | 382/154 |
| 5,059,976 | 10/1991 | Ono et al. | 341/51 |
| 5,068,911 | 11/1991 | Resnikoff et al. | 382/240 |
| 5,086,489 | 2/1992 | Shimura | 382/238 |
| 5,091,782 | 2/1992 | Krause et al. | 348/400 |
| 5,091,977 | 2/1992 | Katata et al. | 382/238 |
| 5,093,872 | 3/1992 | Tutt | 382/243 |
| 5,095,374 | 3/1992 | Klein et al. | 358/430 |
| 5,109,434 | 4/1992 | Shimizu et al. | 382/276 |
| 5,109,451 | 4/1992 | Aono et al. | 382/166 |
| 5,121,216 | 6/1992 | Chen et al. | 358/261.3 |
| 5,122,873 | 6/1992 | Golin | 348/390 |
| 5,123,061 | 6/1992 | Pritchard | 382/233 |
| 5,126,842 | 6/1992 | Andrews et al. | 348/384 |
| 5,129,015 | 7/1992 | Allen et al. | 382/167 |
| 5,138,673 | 8/1992 | Yoshida et al. | 382/238 |
| 5,148,271 | 9/1992 | Kato et al. | 348/390 |
| 5,150,430 | 9/1992 | Chu | 382/246 |
| 5,163,104 | 11/1992 | Ghosh et al. | 382/240 |
| 5,166,987 | 11/1992 | Kageyama | 382/250 |
| 5,185,819 | 2/1993 | Ng et al. | 382/234 |
| 5,187,755 | 2/1993 | Aragaki | 382/239 |
| 5,212,742 | 5/1993 | Normile et al. | 382/166 |
| 5,214,507 | 5/1993 | Aravind et al. | 348/390 |
| 5,214,721 | 5/1993 | Fukuhara et al. | 382/243 |
| 5,220,422 | 6/1993 | Oh | 348/398 |
| 5,228,098 | 7/1993 | Crinon et al. | 382/240 |
| 5,231,679 | 7/1993 | Matsuura et al. | 382/232 |
| 5,247,590 | 9/1993 | Fukuhara et al. | 382/243 |
| 5,265,180 | 11/1993 | Golin | 382/236 |
| 5,267,051 | 11/1993 | Dellert et al. | 358/426 |
| 5,271,071 | 12/1993 | Waite | 382/244 |
| 5,274,719 | 12/1993 | Taniguchi et al. | 382/247 |
| 5,282,256 | 1/1994 | Ohsawa et al. | 382/252 |
| 5,287,193 | 2/1994 | Lin | 358/261.1 |
| 5,287,420 | 2/1994 | Barrett | 382/233 |
| 5,289,549 | 2/1994 | Rattey et al. | 382/238 |
| 5,293,379 | 3/1994 | Carr | 370/474 |
| 5,293,434 | 3/1994 | Feig et al. | 382/234 |
| 5,293,580 | 3/1994 | Shimizu | 382/243 |
| 5,295,203 | 3/1994 | Krause et al. | 382/248 |
| 5,298,895 | 3/1994 | Van Maren | 341/51 |
| 5,300,949 | 4/1994 | Rodriguez et al. | 345/202 |
| 5,301,269 | 4/1994 | Alcorn | 345/432 |
| 5,303,313 | 4/1994 | Mark et al. | 382/235 |
| 5,303,372 | 4/1994 | Oliver et al. | 382/238 |
| 5,305,399 | 4/1994 | Allen et al. | 382/234 |
| 5,307,163 | 4/1994 | Hatano et al. | 348/415 |
| 5,309,526 | 5/1994 | Pappas et al. | 382/237 |
| 5,311,602 | 5/1994 | Nieglos et al. | 382/232 |
| 5,313,534 | 5/1994 | Burel | 382/238 |
| 5,315,670 | 5/1994 | Shapiro | 382/240 |
| 5,317,428 | 5/1994 | Osawa et al. | 358/539 |
| 5,319,724 | 6/1994 | Blonstein et al. | 382/248 |
| 5,321,776 | 6/1994 | Shapiro | 382/240 |
| 5,323,155 | 6/1994 | Iyer et al. | 341/51 |
| 5,327,248 | 7/1994 | Miller et al. | 358/261.4 |
| 5,329,616 | 7/1994 | Silverbrook | 345/508 |
| 5,335,088 | 8/1994 | Fan | 358/429 |
| 5,335,299 | 8/1994 | Atkinson | 382/244 |
| 5,339,164 | 8/1994 | Lim | 358/261.1 |
| 5,341,440 | 8/1994 | Earl et al. | 382/233 |
| 5,347,600 | 9/1994 | Barnsley et al. | 382/249 |
| 5,367,629 | 11/1994 | Chu et al. | 382/253 |
| 5,379,351 | 1/1995 | Fandrianto et al. | 382/236 |
| 5,390,262 | 2/1995 | Pope | 382/234 |
| 5,408,542 | 4/1995 | Callahan | 382/244 |
| 5,412,741 | 5/1995 | Shapiro | 382/232 |
| 5,416,857 | 5/1995 | Chen et al. | 382/237 |
| 5,420,942 | 5/1995 | Levit | 382/276 |
| 5,422,964 | 6/1995 | Devimeux et al. | 382/266 |
| 5,428,693 | 6/1995 | Murakami et al. | 382/232 |
| 5,430,812 | 7/1995 | Barnsley et al. | 382/235 |
| 5,446,806 | 8/1995 | Ran et al. | 382/240 |
| 5,452,102 | 9/1995 | Yokoyama et al. | 358/426 |
| 5,461,681 | 10/1995 | Sato | 382/234 |
| 5,463,699 | 10/1995 | Wilkinson | 382/246 |
| 5,463,701 | 10/1995 | Kantner et al. | 382/166 |
| 5,471,207 | 11/1995 | Zandi et al. | 341/107 |
| 5,471,248 | 11/1995 | Bhargava | 348/420 |
| 5,481,307 | 1/1996 | Goldstein | 348/384 |
| 5,485,212 | 1/1996 | Frederick | 348/415 |
| 5,485,533 | 1/1996 | Hatano et al. | 382/236 |
| 5,491,564 | 2/1996 | Hongu | 358/429 |
| 5,497,434 | 3/1996 | Wilson | 382/232 |
| 5,497,435 | 3/1996 | Berger | 382/249 |
| 5,500,904 | 3/1996 | Markandey et al. | 382/103 |
| 5,502,778 | 3/1996 | Ishikawa et al. | 382/239 |
| 5,513,279 | 4/1996 | Yoshinari et al. | 382/232 |
| 5,517,582 | 5/1996 | Earl et al. | 382/233 |
| 5,517,583 | 5/1996 | Horiuchi et al. | 382/239 |
| 5,519,787 | 5/1996 | Melen | 382/169 |
| 5,521,641 | 5/1996 | Kinouchi et al. | 348/401 |
| 5,524,067 | 6/1996 | Miyake et al. | 382/234 |
| 5,533,138 | 7/1996 | Kim et al. | 382/232 |
| 5,537,477 | 7/1996 | Gauthier et al. | 381/314 |
| 5,537,493 | 7/1996 | Wilkinson | 382/240 |
| 5,537,494 | 7/1996 | Toh | 382/242 |
| 5,537,616 | 7/1996 | Higuchi | 382/239 |
| 5,539,842 | 7/1996 | Schwartz | 382/232 |
| 5,542,008 | 7/1996 | Sugahara et al. | 382/248 |
| 5,546,477 | 8/1996 | Knowles et al. | 382/242 |
| 5,548,336 | 8/1996 | Ueda | 348/384 |
| 5,686,962 | 11/1997 | Chung | 348/402 |
| 5,732,205 | 3/1998 | Astle | 345/431 |
| 5,748,795 | 5/1998 | Ohnishi | 348/404 |
| 5,777,599 | 7/1998 | Poduska | 345/136 |

OTHER PUBLICATIONS

*The Wavelet Toolbox*, Aug. 1, 1996, http://www.mathworks.com/products/wavelettbx.shtml.

*The Wavelet Toolbox*, Powerful Tools For Signals And Image Analysis, Compression, And De–Noising, Aug. 1, 1996, http://www.mathworks.com/products/wavelettbx.shtml.

*The Mathworks Is Pleased To Announce The Release Of The MATLAB Compiler and MATLAB C Math Library*, Aug. 1, 1996, http://www.mathworks.com/products/matlab.shtml.

*The Mathworks Announces The First Commercial Wavelet Analysis Tool For Engineering Applications*, Aug. 1, 1996, http://www.mathworks.com/products/wavelet_release.shtml.

*The Student Edition Of MATLAB version 4*, Aug. 1, 1996, http://www.mathworks.com/matlabstu.html.

*Wavelet–Based De–Noising Preserves Underlying Signal*, Aug. 1, 1996, http://www.mathworks.com/products/wavelettbx.shtml.

*Wavelets At Imager*, Aug. 1, 1996, http://www.cs.ubc.ca/nest/imager/contributions/bobl/wvlt/top.html.

*Network World Technical Seminar: Intranets: Technologies, Tools & Strategies*, Jul. 30, 1996, http://www.checkpoint.com/press/seminars.html.
*Firewall–1 For The Windows NT Platform*, Jul. 30, 1996, http://www.checkpoint.com/nt.html.
*Videoconferencing At PictureTel: Company Highlights*, Jul. 30, 1996, http://www.picturetel.com/coinfo.htm#numbers.
*VivoActive Overview And Benefits*, Jul. 30, 1996, http://www.vivo.com/vivoactive/index.html.
*About Vivo Software*, Jul. 30, 1996, http://www.vivo.com/company/index.html.
Will Gee, *Special Feature: Windows NT Tips, Tricks And Resources*, Jul. 30, 1996, http://www.techhelper.com/default.cgi?Featurent.
Sean Fulton, *Streaming Multimedia Hits the 'Net*, Jul. 30, 1996, http://techweb.cmp.com/cw/072296/620max.htm.
*VDOnet—Real Time Video & Audio Over The Internet*, Jul. 30, 1996, http://www.vdo.net/enhanced.html.
*About VDOnet*, Jul. 30, 1996, http://www.vdo.net/info/info.html.
*All About S/MIME*, Jul. 30, 1996, http://www.rsa.com/rsa/S–MIME/.
*Enhanced CU–SeeME Windows v2.02*, Jul. 30, 1996, http://goliath.wpine.com/readme202.htm.
*Product Comparison Highlights—Internet Firewalsl*, Jul. 29, 1996, http://www.infoworld.com/pageone/testcenter/tcenter.htm.
*Where Can I Get Image Compression Programs?*, Jul. 29, 1996, http://www.cis.ohio–state.edu.
*Research At The CIPR*, Jul. 29, 1996, http://ipl.rpi.edu/cipr_research.html.
*Video Conferencing And Distance Learning*, Jul. 29, 1996, http://ipl.rpi.edu/conferencing.html.
*Computer Communication Networks On Mosaic*, Jul. 29, 1996, http://bach.ecse.rpi.edu/~sibal/ccn.html.
*IPT CD–ROM Content Summary*, Jul 29, 1996, http://www.ncc.com/cdroms/ipt/ipt_content.html.
*Vista Home Page*, Jul. 29, 1996, http://www.cs.ubc.ca/nest/lci/vista/vista.html.
*Software And Hardware For Pattern Recognition And Image Processing Research*, Jul. 29, 1996, http://www.ph.tn.tudelft.nl/PRInfo/software.html.
*Computer Vision Source Code*, Jul. 29, 1996, http://www.cs.cmu.edu/afs/cs/project/cil/www/v–source.html.
*MegaWave2 version 1.04*, Jul. 29, 1996, http://www.ceremade.dauphine.fr/~mw/megawave2–new.html.
*WaveLib—A Wavelet Library*, Jul. 29, 1996, http://www.sim.int–evry.fr/~bourges/WaveLib.html.
*Wavelets—Internet Sources*, Jul. 29, 1996, http://www.mat.sbg.ac.at/~uhl/wav.html.
*SPIHT—Image Compression With Set Partitioning In Hierarchical Trees*, Jul. 29, 1996, http://ipl.rpi.edu:80/SPIHT/.
*SPIHT Image Compression—Properties Of The Method*, Jul. 29, 1996, http://ipl.rpi.edu:80/SPIHT/spihtl.html.
*SPIHT Image Compression—Licensing Information*, Jul. 29, 1996, http://ipl.rpi.edu:80/SPIHT/spiht2.html.
*Wavelet Video—For Digital Communications*, Jul. 29, 1996, http://www.summus.com/wave_vid.htm.
*Wavelet Image—Wavelet Image*, Jul. 29, 1996, http://www.summus.com/i_comp.htm.
*Wavelet Image—Features And Capabilities*, Jul 29, 1996, http://www.summus.com/i_feat.htm.
*Wavelet Image—Products*, Jul. 29, 1996, http://www.summus.com/wi_softw.htm.
*Wavelet Theory—Why Wavelets Are Good For Image Compression*, Jul. 29, 1996, http://www.summus.com/wavelets.htm.
*Wavelet Image—Decompressor Netscape Plugin*, Jul. 29, 1996, http://www.summus.com/download.htm.
*OLiVR—OLiVR Corporation Presents A Major Breakthrough In 3–D Streaming Media: OLiVR*, Jul. 29, 1996, http://www.OLiVR.com/home.htm.
*OLiVR Frequently Asked Questions*, Jul. 29, 1996, http://www.OLiVR.com/facts/olifaq.htm.
*OLiVR Glossary*, Jul. 29, 1996, http://www.OLiVR.com/facts/gloss.htm.
*OLiVR Product Backgrounder*, Jul. 29, 1996, http://www.OLiVR.com/facts/prodbg.htm.
*OLiVR Corporate Backgrounder*, Jul. 29, 1996, http://www.OLiVR.com/facts/corpbg.htm.
*OLiVR News Release: Internet Industry Leaders Announce Support for OLiVR™*, Jul. 29, 1996, http://www.OLiVR.com/facts/indusld.htm.
*Microsoft and White Pine Join Forces In Worldwide Licensing Agreement*, Jul. 23, 1996, http://goliath.wpine.com/prnetmeet2.htm.
*White Pine And BBN Corporation To Provide Increased Internet Access To Enhanced CU–See ME® Software*, Jul. 23, 1996, http://goliath.wpine.com/prbbn.htm.
*NTT International In Japan Teams With White Pine Software For Enhanced CU–See Me® Videoconferencing Solutions*, Jul. 22, 1996, http://goliath.wpine.com/prntt.htm.
*VDOnet Works With Microsoft To Advance The Video Conferencing Market*, Jul. 22, 1996, http://www.vdo.net/info/pr22.html.
*Microsoft And VDOnet Team For Live Web Broadcast Of Worldwide Live*, Jul. 16, 1996, http://www.vdo.net/info/pr21.html.
*FTP Software's OnNet32 v2.0 Raises The Bar On TCP/IP Connectivity By Delivering Five Industry "Firsts,"* Jul. 15, 1996, http://www.ftp.com/mkt_info/pr/pr–on2–715.htm.
Kiran Mouva, *Psstt! Security Designed For Your Eyes* Only, CMP *Media Inc.—Network Computing*, Issue: 711, Jul. 15, 1996.
*The Wavelet Digest*—vol. 5, Issue 5, Jul. 12, 1996, http://www.math/scarolina.edu/→wavelet/Arch/Digest_5_5.html#8.
*PictureTel Announces Immediate Availability Of A Standards–Based, Software–Only Videoconferencing Product That Operates Over Traditional Telephone Lines*, Jun. 19, 1996, http://www.picture1.com/vivopr.htm.
*Compression Technology*, Jun. 18, 1996, http://www.npac.syr.edu/.
*NBC Desktop Video, PBS, And Cisco Join VDOnet Initiative To Bring Multicast Video To The Internet*, Jun. 13, 1996, http://www.vdo.net/info/pr19.html.
*CBS News To Provide Live, Gavel–To–Gavel Video Coverage Of The Republican And Democratic National Conventions On The Internet*, Jun. 4, 1996, http://www.vdo.net/info/pr18.html.
*VDOnet Announces Major Investment By NYNEX*, May 23, 1996, http://www.vdo.net/info/pr17.html.
*Corel To Include Summus Ltd.'s Wavelet Technology In Future Products*, May 16, 1996, http://www.summus.com/corelsum.htm.
Elinor Mills, *Security Dynamics' Purchase Of RSA Data Creates Encryption Powerhouse, InfoWorld Electric*, Apr. 15, 1996, http://www.infoworld.com/cgi–bin/displayArchives.pl?960415. secdynamicsbuysrsa.htm.

Karen Rodriguez, *Secure Mail Spec. Gets Boost—Secure MIME Will Soon See Broad Industry Support, CMP Media Inc.—CommunicationsWeek*, Issue: 605, Apr. 8, 1996.

*Checkpoint And VDONet Partner To Bring Internet Video Behind Firewall*, Mar. 20, 1996, http://www.vdo.net/info/pr9.html.

*VDOlive Delivers On New Microsoft Internet Technology*, Mar. 12, 1996, http://www.vdo.net/info/pr8.html.

*VDOlive Internet Video Servers Introduced*, Jan. 23, 1996, http://www.vdo.net/info/pr6.html.

*The Wavelet Toolbox*, The Math Works, Inc., 1996.

Gilbert Strang, *Wavelets: The Transformation Of Signals Into A Sum Of Small, Overlapping Waves Offers A New Method For Analyzing, Storing and Transmitting Information, American Scientist*, vol. 82, pp. 250–255, May–Jun. 1994.

*MATLAB®, The Ultimate Technical Computing Environment™*, The Math Works, Inc., 1996.

Jason Spielman, *Motion Pictures Experts Group (MPEG) ISO 11172a, Video Compression, Decompression Standard*, Jun. 22, 1993.

Fig. 2
|   | x |   | x+2 |   | x+4 |   | x+6 |   |
|---|---|---|-----|---|-----|---|-----|---|
| Y | X |   | X   |   | X   |   | X   |   |
|   |   |   |     |   |     |   |     |   |
| Y+2 | X |   | X |   | X |   | X |   |
|   |   |   |     |   |     |   |     |   |
| Y+4 | X |   | X |   | X |   | X |   |
|   |   |   |     |   |     |   |     |   |
| Y+6 | X |   | X |   | X |   | X |   |
|   |   |   |     |   |     |   |     |   |
(192x128 Pixels)
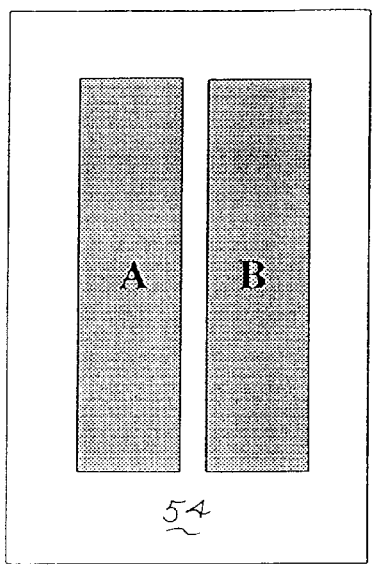
Fig. 3(a)
Base Image
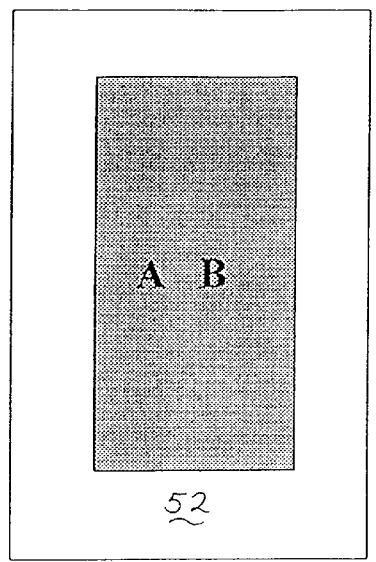
Fig. 3(b)
Current Image
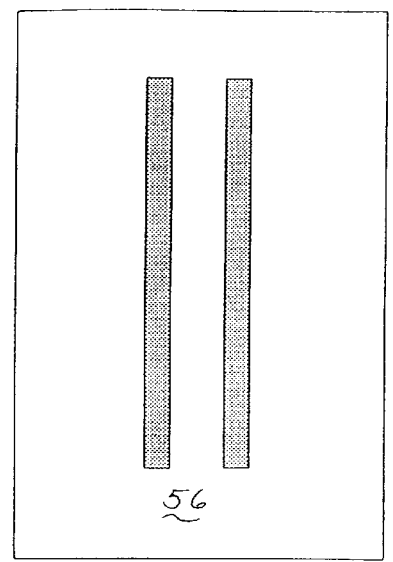
Fig. 3(c)
Difference Header Structure  Fig. 6
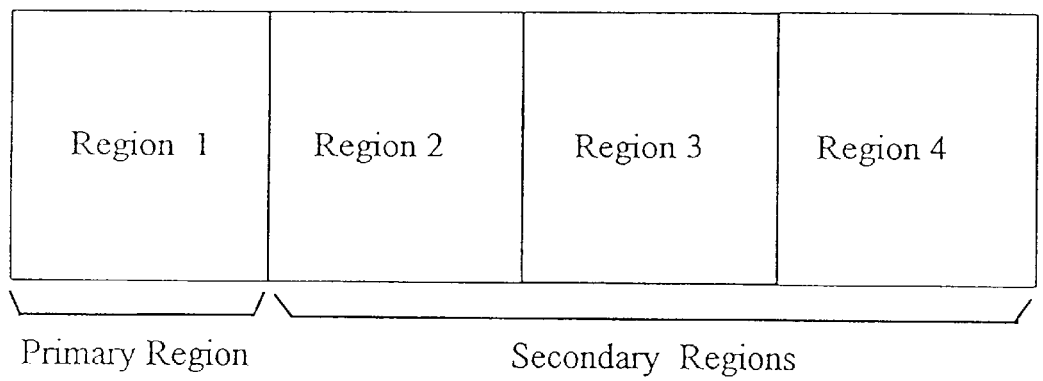
Primary Region          Secondary Regions
Fig. 7  Quad-Tree Header Information
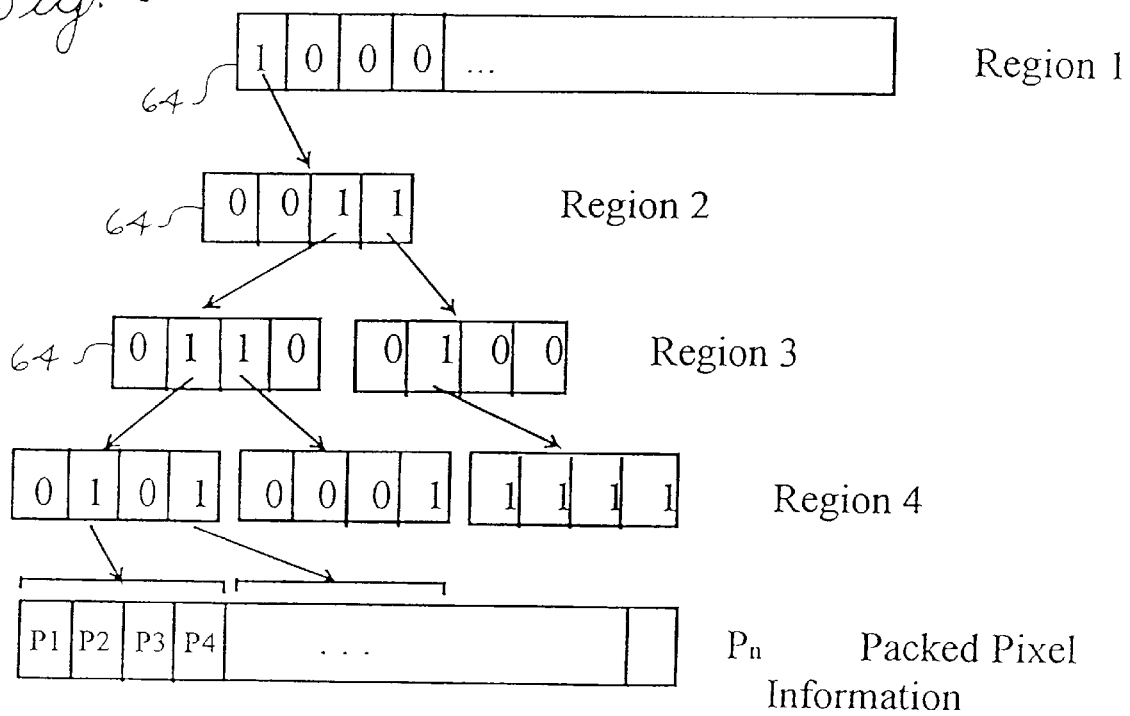

*Fig. 8(a)*
Packed Pixel Information
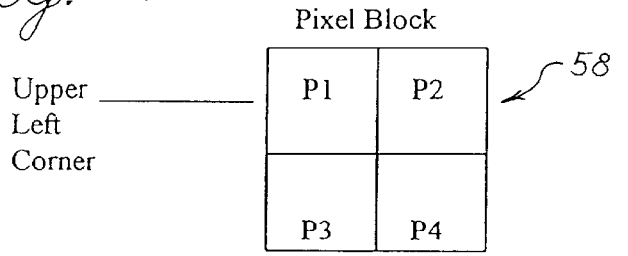
Packed Pixel Information
| P1 | P2 | P3 | P4 | ... |
|----|----|----|----|-----|
*Fig. 8(b)*
Environment Stabililization
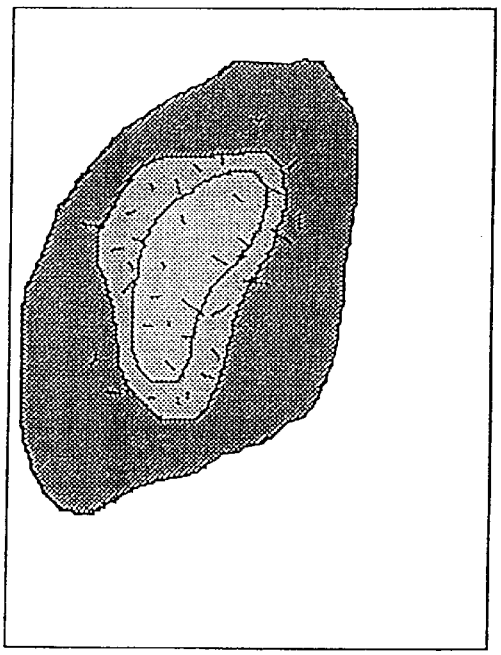
Unfiltered Image
*Fig. 9(a)*
Environment Stabililization
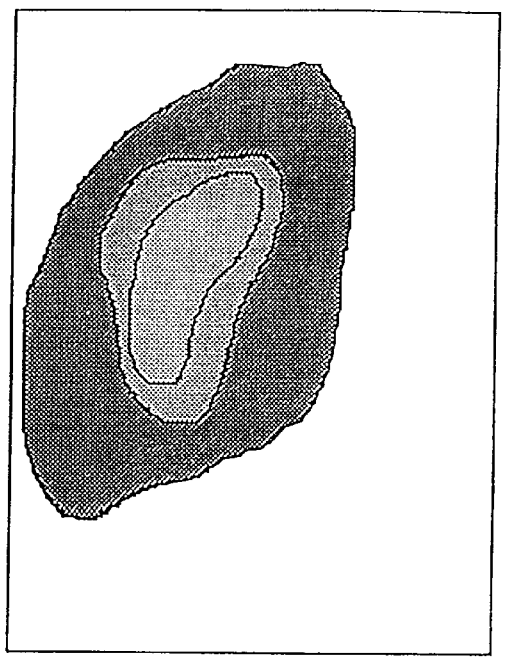
Filtered Image
*Fig. 9(b)*

Proportional Dither
Proportional Dither
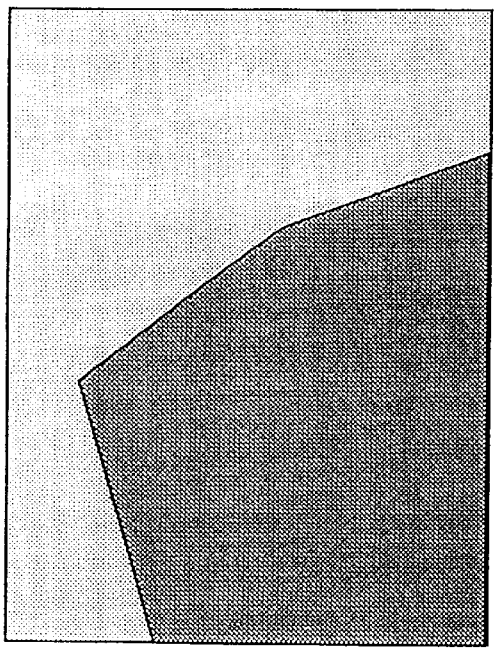
Original Image
Fig. 12 (a)
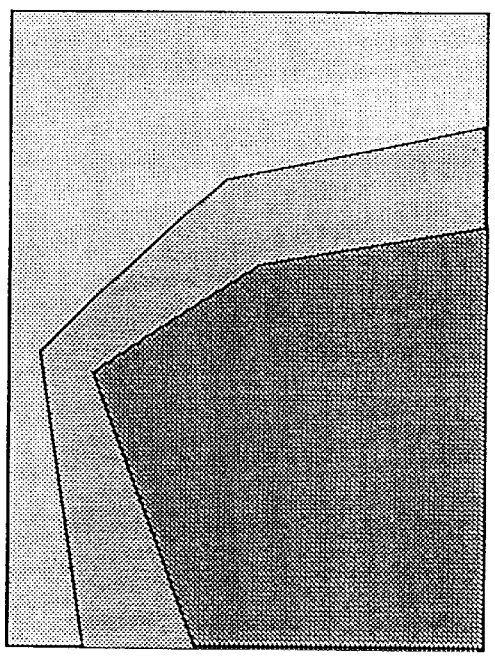
Proportional Dithered Image
Fig. 12 (b)
Proportional Dither
Fig. 13
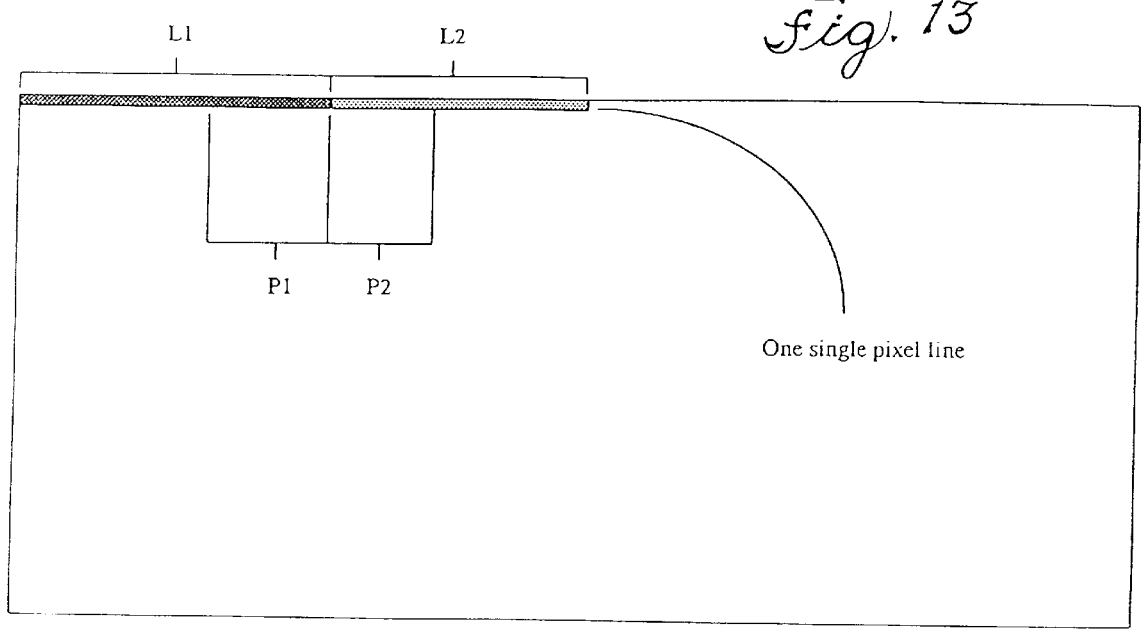

DIGITAL DATA COMPRESSION WITH QUAD-TREE CODING OF HEADER FILE

This application claims priority to U.S. Provisional patent application Ser. No. 60/028,273, filed Oct. 11, 1996.

A microfiche appendix, containing two sheets of microfiche (133 frames total), is included with this application. The contents of the microfiche appendix are hereby expressly incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This invention relates in general to the encoding and decoding of digital information, and in particular, to a compression system that enables unidirectional transmission of full-motion video over ordinary analog telephone lines.

BACKGROUND OF THE INVENTION

Data compression is particularly important in the art of image storage and transmission. Images by their nature require or incur a large amount of data for their expression. A moderate resolution monotone image, for example, might consist of 640 picture elements, referred to as "pixels" or "PELs," per horizontal line. The monotone image typically includes 480 horizontal rows or lines, each containing 640 pixels per line. With 480 of such horizontal lines, a total of 307,200 pixels is displayed in a single 640×480 pixels image. If each pixel of the monotone picture requires one byte of data to describe it, a total of 307,200 bytes are required to describe just one black and white image.

Similarly, one standard color image of 640×480 pixels requires approximately 7.4 megabits of data to be stored or represented in a computer system. This number is arrived at by multiplying the horizontal and vertical resolution by the number of required bits to represent the full color range (or 640×480×24=7,372,800 bits). One frame of digitized NTSC (National Television Standards Committee) quality video comprises 720×480 pixels, which requires approximately one half megabyte of digital data to represent the image (720×480×1.5 bytes per pixel). In an NTSC system that operates at approximately 30 frames per second, therefore, digitized NTSC-quality video will generate approximately 15.552 megabytes of data per second.

Without compression, assuming a storage capability of one gigabyte and a two megabyte per second access rate, it is possible to either store 65 seconds of live video and to play it back at 3 frames per second, or store 21 high quality still images taking 24 seconds to store or retrieve each image. Lack of data compression in the transmission of such images forces the user to spend large amounts of time and money storing, sending and receiving the images. In practical terms this means that the user spends a lot of time waiting to receive each image. This is annoying to the user, and particularly disturbing if successive images need to be transmitted such as in the case of live or full-motion video transmission.

Many methods of compressing image data exist and are well known to those skilled in the art. Some of these methods are completely reversible, also known as "lossless" compression, in that they reverse upon decoding (decompressing) to exactly restore the original data without the loss or elimination of any data. These lossless compression techniques, however, cannot compress data to sufficiently large degrees without beginning to lose information. Because the reduction ratios are small, these lossless techniques cannot satisfy the transmission rates required for full-motion video transmission over analog telephone lines.

Other compression methods exist that are non-reversible, also known as "lossy" compression. These non-reversible methods offer considerable compression, but result in a loss of data due to their high rates of compression. The high compression rates are actually achieved by eliminating certain aspects of the image. There are generally two groups of non-reversible (i.e., lossy) compression techniques. One group applies transforms, such as the discrete cosine transform (DCT), to local areas of an image. Another group truncates or eliminates various of the resulting coefficients, thus reducing the amount data required for transmission. After transmission, an inverse transform is performed on the reduced data set to decompress and restore a reasonable facsimile of the original image. These lossy compression techniques can be combined with reversible methods for even greater levels of data compression. In general, however, the loss of data caused by the various prior art compression techniques is all too noticeable for transmitting a series of successive images, such as in the transmission of full-motion video. These methods are good at eliminating changes with a high spatial "frequency" but also generate substantial amounts of image data. The resultant compression ratios are good. However, the compression methods are very computation intensive, requiring significant processing power and/or much computation time.

Presently, commercially available modems allow a maximum of 33.6 Kbps (Kilobits per second) of data to be transmitted over a regular telephone ("POTS") line. Existing video compression systems employed for encoding and transmitting video over digital channels such as a T1 trunk or an Integrated Systems Digital Network (ISDN) line typically require much higher bandwidth (i.e., 56 Kbps or higher). A fixed bandwidth is typically allocated to video information. In a fiber distributed data interface (FDDI) with a bandwidth of 200 megabits per second, for example, 1.5 channels of live video can be accommodated or transmitted at the rate of one frame or image every two seconds. Conventional compression systems, therefore, cannot be used for encoding and transmitting video over ordinary analog telephone lines. To transmit full-motion video, one alternative is to use dedicated and special channels with existing video compression systems. The use of special and dedicated channels, however, is expensive.

Recent demands for full-motion video in applications such as video mail, video telephony, video teleconferencing, image database browsing, multimedia broadcasting, and other applications have required that improvements be developed for video compression so that video data can be successfully transmitted at appropriate transmission rates over a telephone line. It can be seen that data compression is still required in order to transmit and display full-motion video at 30 frames per second. Additional compression is required in order to reduce the amount of storage necessary, and increase the throughput, to transmit and display full-motion video in a quality closely approximating NTSC television. A need exists to achieve full-motion video transmission over analog telephone lines.

It is an object of this invention therefore to transfer full-motion video images over a two wire transmission medium such as a telephone line.

It is a further object of the invention to encode and compress real-time full-motion video using a camera or a television input from one computer station, through a telephone line, to another computer station, which decompresses and decodes the data to display full-motion video.

SUMMARY OF THE INVENTION

In view of the above, a system and method for compressing and transmitting video data over a transmission medium is provided. According to the method of the invention, an image is represented as a group of pixels where each pixel is expressed in a truncated format. The group of pixels is then divided into elemental blocks of pixels suitable for compression. A base image representing a reference for comparison of successive images in order to detect change in the successive images is then stored. The changes from the base image are encoded by storing the location of any change and the value of changed data, where the location of any change is stored in the form of a header file. The stored header file and changed data are then compressed using a quad-tree format compression algorithm. A signal is then generated representing a compressed header file and changed data.

In one aspect of the method of the invention, the compressed header file and changed data are received and decompressed. The changes from the base image are decoded and the changed image is restored based on the location of any change and the value of the changed data. In the preferred embodiment of the method of the invention, the signal generated representing the compressed header file and changed data is communicated over a communication medium such as an analog telephone line.

According to the system of the invention, an input is provided in order to receive an image as a group of pixels, where each pixel is expressed in a truncated format. Means for dividing the group of pixels into elemental blocks of pixels suitable for compression is also provided. A memory operative to store a base image representing a reference for comparison of successive images is provided to detect change in the successive images. Means for encoding the changes from the base image by storing the location of any change and the value of the changed data in a header file is provided, where the header file is disposed in the memory. A first processor is coupled to the memory and operative to compress the stored header file and changed data using a quad-tree format compression. Means are also provided for generating a signal representing the compressed header file and changed data.

In another aspect of the system of the invention, a receiver is coupled to receive the compressed header file and changed data. A second processor is provided that is operative to decompress the compressed header file and changed data. Means are provided for decoding the changes from the base image. Means are also provided for restoring the changed image based on the location of any change and the value of changed data. In the preferred embodiment, an output is coupled to the first processor and is operative to transmit the compressed header file and changed data over a communication medium such as an analog telephone line.

Accordingly, the invention provides the ability to transmit live, full-motion video over plain old telephone system wiring. Live video images can thus be communicated between two computers over the Internet or World Wide Web. The features of the invention can also be applied to the digital encoding or transmission of any data. For example, the encoding and compression techniques of the invention can be used to quickly and efficiently store data on a CD-ROM or other memory device. Moreover, the features and advantages of the invention can be used to provide improved teleconferencing capabilities, line Internet transmission, video telephone communications, archive transmission, Intranet conferencing, and live video games.

These and other features and advantages of the invention will be apparent upon a review of the following detailed description of the presently preferred embodiments of the invention, taken in conjunction with the appended drawings.

BRIEF DESCRIPTION OF THE DRAWINGS

FIG. 1 shows a block diagram of the transmission system of the invention, where

FIG. 2 shows one presently preferred sampling pattern for use with the invention.

FIG. 3 illustrates the comparison of a base image to the current image, where FIG. 3(a) illustrates the two frames that make up the base image, FIG. 3(b) illustrates the current image frames, and FIG. 3(c) shows those portions of change within the current image.

FIG. 6 illustrates the presently preferred header structure for use with the invention.

FIG. 7 illustrates the correlation of quad-tree header information to the various regions illustrated in FIG. 5.

FIG. 8 illustrates the representation of packed pixel information, where FIG. 8(a) shows the presently preferred 2×2 pixel block, and FIG. 8(b) shows the corresponding placement of pixels in the header file.

FIG. 9 illustrates the presently preferred environmental stabilization technique of the invention, where FIG. 9(a) illustrates an unfiltered image and FIG. 9(b) illustrates the filtered image.

FIG. 11 illustrates updating of the base image, where FIG. 11(a) identifies the original base image.

FIG. 12 illustrates the effect of the presently preferred proportional dither routine, where FIG. 12(a) shows the original image, and FIG. 12(b) shows the image after proportional dithering.

FIG. 13 illustrates the length and intensity components of a single pixel line using the presently preferred proportional dither routine shown in FIG. 12.

FIG. 14 illustrates a flow chart of the preferred computer programs included in the microfiche appendix, where

DETAILED DESCRIPTION OF THE PRESENTLY PREFERRED EMBODIMENTS

Figure 1A:
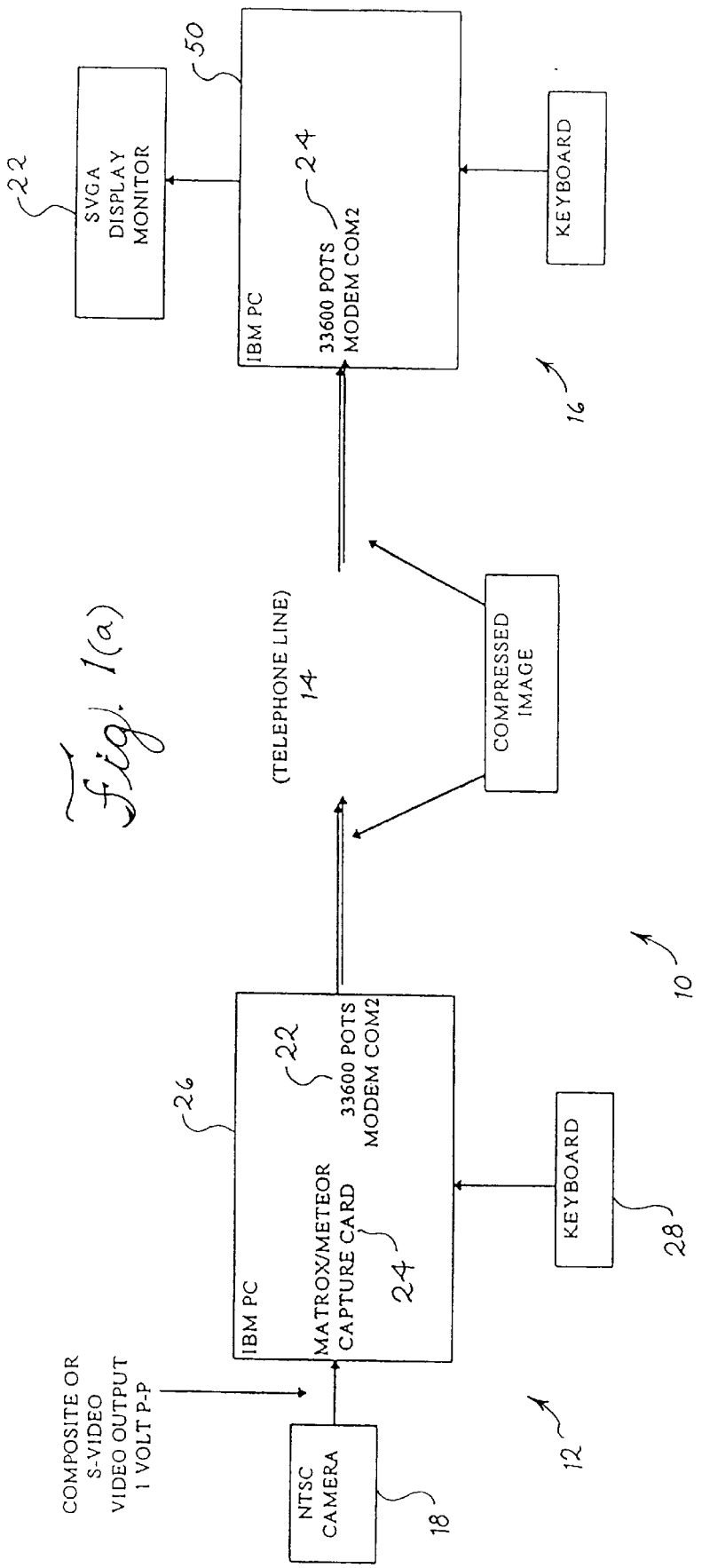
FIG. 1(a) illustrates the capture and receive ends of the system.

Reference is now made to the drawings where like reference numerals refer to like elements throughout.

I. TRANSMISSION/COMMUNICATION SYSTEM

Referring first to FIG. 1(a), a block diagram is provided of one presently preferred communication or transmission system 10. According to the system 10, a source image is received or obtained on the encode side 12 of the transmission interface 14. The source image is processed by the system 10 so that it can be transmitted in real-time to the decode side 16 of the interface 14. Once received, the system 10 processes the received image to present full-motion video over a display device 20.

In the presently preferred embodiment of the invention, the transmission interface 14 medium is a simple two wire system, such as a telephone line or the like. As those skilled in the art will appreciate, however, other transmission media are also suitable for the communication of digital data without departing from the spirit and scope of the invention, such as fiber optics, Integrated Systems Digital Network (ISDN) lines or a T1 trunk, and are therefore contemplated.

In order to adequately represent live motion video, approximately 30 frames per second of moving image data should be transmitted over the transmission medium 14. Because of the size of the image typically captured, and the transmission speed limitations of the currently available communications equipment, the source image(s) needs to be encoded and compressed in order to present full-motion video on the decode side 16 of the medium 14. In the presently preferred embodiment of the invention, therefore, a unique pixel representation of the source image is compressed and filtered prior to transmission. Upon receipt of the transmitted signal, the compression steps are reversed or undone. A detailed description of the compression, filtering and pixel representation functions is provided below.

In general, the front end of the transmission process captures successive frames of color image data. The next step of the process samples the captured images in order to decrease the required information needed to transfer the image down a telephone line, while keeping sufficient information to successfully reconstruct the image at the other end. A compression technique is used to encode and further decrease the size of each image frame. In order to achieve the desired frame rate to transfer full-motion video over POTS, a lossy compression technique is preferred. Complete restoration of the original image is therefore not necessary in order to convey an aesthetically pleasing, smooth video image. The transmission of the compressed data down the telephone line can then take place. The back end of the transmission process receives the compressed data from the telephone line. The compression operation is then reversed in order to restore a reasonable approximation of the original image information.

Image Capture

Referring again to FIG. 1(a), a camera 18 is disposed on the encode side 12 of the interface 14 to capture one or more digital images. The camera 18 is shown coupled to a video image capture card 22, which is in turn coupled to a modem 24. In the presently preferred embodiment of the invention, the camera 18 is an NTSC compatible device, and the capture card 22 and modem 24 are housed within a personal computer 26. The personal computer 26 is preferably an IBM-PC compatible computer generally known in the art. The IBM-PC also preferably includes at least an Intel Corporation 80386 microprocessor. As those skilled in the art will appreciate, more advanced Intel microprocessors, such as the presently available Pentium microprocessor, provide advanced performance over the 80386 and are preferred. The tradeoff between microprocessors is the frame rate that can be transmitted by the system, e.g., the more advanced the processor speed the higher the frame rate. Currently available modems 24 can operate at speeds of 33.6 Kbps and are also preferred; however, 28.8 Kbps modems are more readily available and can be used in an alternate embodiment. A keyboard 28 is also coupled to the computer 26 in a manner generally known in the art.

Figure 1B:
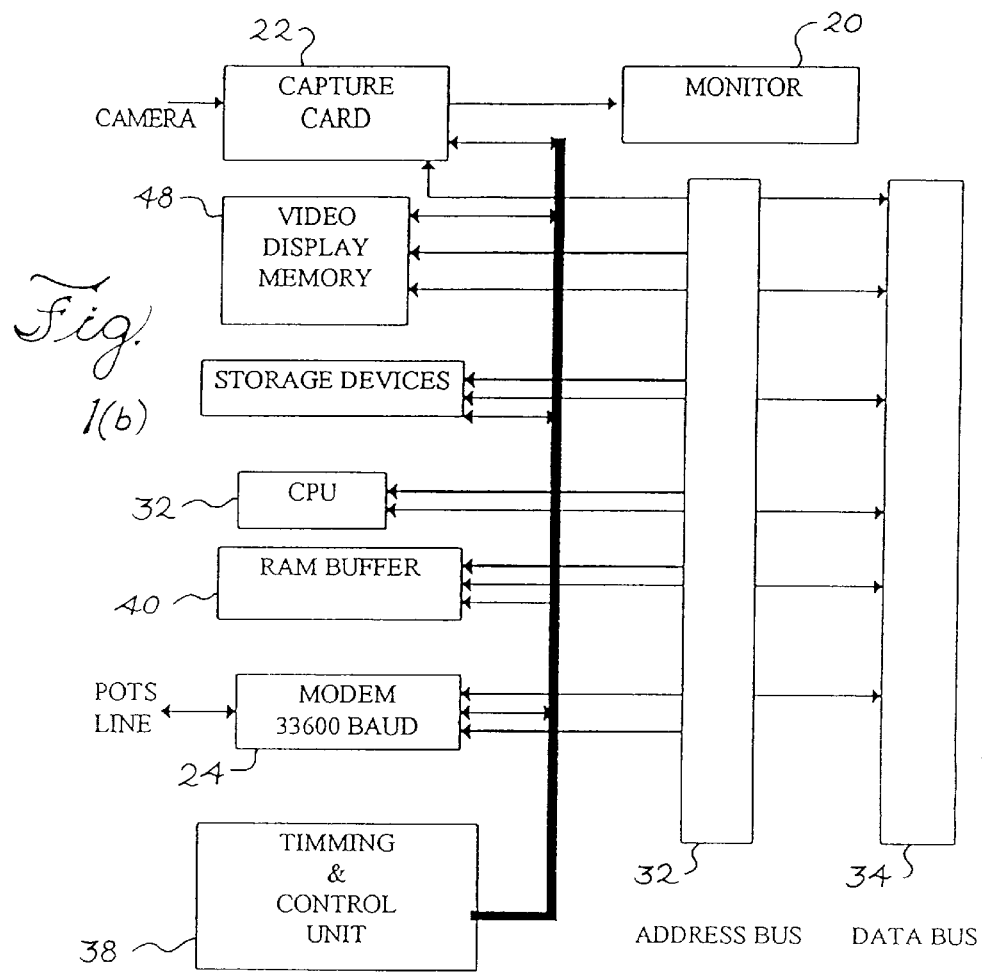
FIG. 1(b) illustrates a functional block diagram of a universal asynchronous receiver transmitter integrated circuit.

The composite output of the video camera 18 is input to the video capture card 22, which is preferably installed in an expansion slot (not shown) of an IBM-PC DX4-100 computer. The analog composite video information is extracted by the capture card 22 from the signal received from the camera 18 (leaving just the sync pulses), which includes about 400 TV lines of resolution presented in an interlaced manner. Interlacing divides the video frame into odd and even fields that are eventually combined to provide a single picture frame. This information is then digitized and placed into a memory buffer 30, as shown in FIG. 1(b). In the preferred embodiment, the memory buffer 30 is random access memory (RAM) 40 housed within the computer 26. The presently preferred computer program, which resides in the program memory (not shown) of the computer 26 reads the memory buffer 30 and encodes the image data according to the principles described below. The presently preferred computer program is written in the C computer language (a copy of which is included in the microfiche appendix), and is further described below.

A more detailed block diagram of the presently preferred system architecture of the encode side 12 is shown in FIG. 1(b). As shown, all input/output (I/O) devices are connected to a CPU 32 by a unidirectional address bus 34 and a bi-directional data bus 36. Both busses 34, 36 are controlled by a timing and control unit 38. The image frame captured by the camera 18 is received by the capture card 22 and stored in a video display memory 48. From there, the stored image is transferred to the memory buffer 30 where it is encoded by the program. The encoded (compressed) image file is then transferred to a communication circular buffer. The communication circular buffer is a FIFO output buffer preferably made up of 16K bytes of the RAM memory 40 housed within the computer 26.

Figure 1C:
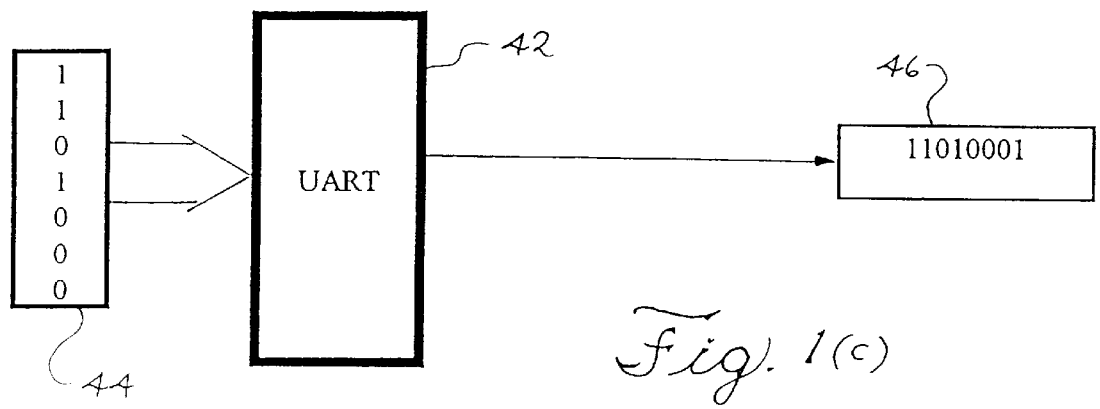
FIG. 1(c) shows a block diagram of a typical image capture card.

The encoded data is then transferred to a Universal Synchronous Asynchronous Receiver Transmitter ("UART") disposed in the modem 24, which has an internal 15 byte buffer. The data is transferred in an interrupt driven mode generally known in the art. A block diagram of one presently preferred UART 42 is shown in FIG. 1(c). In a manner generally known in the art, the UART 42 converts parallel data 44 to serial data 46. A modem 24 including a 16650 UART chip, made by National Semiconductor, part no. NS16550AFN, is presently preferred. As mentioned above, the modem 24 is preferably a 33.6 Kbps Sportster Faxmodem or Winmodem manufactured by U.S. Robotics of Skokie, Illinois, although other such modems 24 are available. The serial data stream from the UART 42 is then transferred over the transmission interface 14. On the decode side 16, the compressed image is received and decompressed. After decompression, the image is proportionally dithered or scaled to display a larger size picture on the display device 20. The communication processing is preferably done in the background so that the data transfers take place in tandem with the numerical computations performed for the compression and decompression functions.

As those skilled in the art will appreciate, the camera 18 can comprise a digital image camera or other image capture device. In addition, the decoded image can be displayed on a computer or television monitor, cathode ray tube or other display device 20, or communicated to other downstream equipment. Examples of such equipment include, but are not limited to, memory devices such as CD-ROM's (not shown) or magnetic memories (not shown) generally known in the art.

A highly efficient capture card 22 is required to transmit full-motion video data down a telephone line. Commercially available capture cards can provide approximately 30 frames per second capture rate. Due to the interlacing techniques described above, capture rates of at least 60 fields (or 30 frames) per second are needed. Moreover, after a single frame is captured, it is processed to reduce its size, which can decrease the transmission rate to almost half the capture rate. A very high capture rate of 60 fields (or 30 frames) per second is therefore necessary in order to transmit 60 fields (30 frames) per second over a two-wire medium.

Typical capture cards 22 receive an analog input in the form provided by a camera 18 or television signal. This input is usually video, audio, or both. One presently referred capture card 22 is the "Meteor" capture card, revision number 2, manufactured by Matrox Electronics Systems, Ltd. of Montreal, Canada. This capture card 22 includes both DOS and Windows drivers, and uses the following chip set made by Philips Semiconductors of Sunnyvale, Calif.: TDA8708, SAA7196, SAA7116.

Using the presently preferred Meteor capture card 22, capture rates of 30 frames per second can be achieved. However, as mentioned above, processing traditional RGB color planes decreases the frame rate at the decode side 16 to roughly half. Another form of pixel representation is thus required to achieve the 30 frame per second transmission rates necessary for full-motion video. One presently preferred truncated pixel representation technique is described in detail below.

II. PIXEL REPRESENTATION

As mentioned above, on a typical NTSC television screen, one picture frame consists of two fields (Field A and Field B) that are interlaced in a generally known manner to present and display a single image. Field A contains the information, for example, of the even lines of the image, while Field B contains the information of the odd lines. In NTSC television format, 30 such frames are displayed by a television per second. In one second, therefore, the television screen displays 60 fields of information. For clarity, the term "page" will be used hereinbelow to describe a full picture image (i.e., one frame).

The color of each pixel of any image is typically determined by three variables. These variables are usually the three prime colors: red (R), green (G), and blue (B). By mixing these three colors in different proportions, a computer can display different colors of the spectrum. The more variety available to represent each of the three colors, the more colors can be displayed. In order to represent, for example, 256 shades of red an 8-bit number is needed (the range of the values of such a color is thus 0–255). Therefore, the total number of bits needed to represent a pixel is 24 bits (8-bits for red, 8-bits for green, and 8-bits for blue, which is commonly known as "RGB888" format). Thus, a given RGB picture has three planes, the red, the green, and the blue, and the range of the colors in the picture is 0–16.78 million (i.e., R*G*B=256*256*256).

The amount of information currently capable of being transmitted over a telephone line in the interval of one second is restricted to 33,600 bits per second due to the actual wires and switching functions used by the typical telephone company. A single full color ("RGB888") 640× 480 pixel page, which comprises 7,372,800 bits of data, actually takes 219.43 seconds or approximately three and one half minutes to transfer at a baud rate of 33,600 bits per second. To achieve full-motion transmission at the rate described above, the page size is first reduced to 30% of its size (192×144 pixels) from the full screen image (640×480 pixels for a computer). The smaller the image is, of course, the more difficult it is to see. However, even at 192×144 pixels, too much data remains to transmit full-motion video over the telephone lines. One way to further compress the image is to decrease the number of pixels of the image that are sampled, as well as the number of bits needed to represent the color of each pixel.

Sampling Pattern

A sampling pattern used to sample the image to ensure high picture quality and high transmission rates is shown in FIG. 2. The purpose of the sampling pattern is to decrease the amount of information required or contained in each single image to the minimum amount suitable for an acceptable picture. According to the presently preferred sampling pattern shown in FIG. 2, every other pixel of the 192×144 pixel image is sampled. This pattern preserves the spatial information between pixels while keeping the creation of artifacts to a minimum. Using the sample pattern shown in FIG. 2, therefore, allows for a reduction in picture size from 192 columns by 144 rows of pixels to an image of 96×72 pixels. However, as described in detail below the presently preferred compression technique operates on images that are a multiple of 16 pixels in size in both x and y directions. Thus, the 96×72 sampled image is truncated to an image size of 96×64 pixels.

New Pixel Representation

To further compress the 96×64 pixel image, the number of bits used to represent each pixel is also reduced. A typical capture card 22 employs 24 bits to represent each pixel in the RGB888 format. A color scheme based on the YUV color space, and more specifically, on Microsoft Corporation's YUV 9 Planar Format, however, is preferred. The YUV color format also consists of three planes: the Y plane, the U plane and the V plane. The Y plane contains the gray intensities of the pixel. If the user paints just the Y components on a screen, only a black and white image will appear. The U plane and the V plane are the vectors that determine the color of each pixel. Each block of 16 pixels in the YUV 9 Planar Format includes sixteen Y components and one U and one V component. Therefore, eighteen bytes of data are needed to express a sixteen pixel block in the YUV 9 Planar Format.

In the presently preferred embodiment of the invention, after the above sampling is applied to the pixel blocks a 4:1:1 pixel encoding scheme is obtained, where four Y components and one U and one V component are all that is needed to represent the sixteen pixel blocks. According to this scheme, one U and one V value correspond to four intensity values. In the preferred embodiment of the invention where a pixel block size of 2×2 pixels is employed (described in detail below), the 4:1:1 YUV color scheme is a replica of the compressed pixel blocks. Also, the structure of the header file (described below) created by the compression process more easily coincides with the YUV color scheme.

Because the human eye is more sensitive to intensity fluctuation than color fluctuations, the 4:1:1 YUV color scheme also provides a visual advantage. Because each pixel has its own Y component and each pixel shares a U component and a V component with the other neighboring pixels in the block, each 2×2 pixel block shares the same color value but with differing intensities. An illustration of the preferred 2×2 pixel block pattern appears in Table A.

TABLE A

| Ya | Yb |
|----|----|
| Yc | Yd |

The 2×2 YUV pixel block can thus be represented by the following number of bits in the 4:1:1 color scheme:

| 4 Y's: (Ya, Yb, Yc, Yd) | 4 bytes |
|---|---|
| 1 U: | 1 byte |
| 1 V: | 1 byte |
| Total: | 6 bytes (48 bits) |

This presents a reduction over the conventional format used to represent RGB color, which requires the following number of bits to represent each pixel:

| 4 R's: | 4 bytes |
|---|---|
| 4 G's: | 4 bytes |
| 4 B's: | 4 bytes |
| Total: | 12 bytes (96 bits) |

The preferred 4:1:1 YUV color scheme thus yields a reduced bit count for each pixel without substantial degradation of the image.

Video Image Manipulation

Each 2×2 pixel block is further truncated so that each component is reduced by preferably 4 bits (or alternatively 3 bits), leaving only 4 bits (or 5 bits) for each YUV component. A "truncated" YUV color model is used rather than the known YUV pixel representation. For gray-scale images, where only the Y (intensity) value is encoded, the Y value preferably consists of either a 4-bit or 5-bit field. For color images, where the intensity (Y) and both color components (U, V) are encoded, the U and V components also preferably consist of either a 4-bit or 5-bit binary representation. This truncation thus results in an additional reduction in bits required to represent a pixel in the transmitted image. The 2×2 pixel block can then be represented by the following reduced number of bits:

| 1st Y: | 4 bits | (or 5 bits) |
|---|---|---|
| 2nd Y: | 4 bits | (or 5 bits) |
| 3rd Y: | 4 bits | (or 5 bits) |
| 4th Y: | 4 bits | (or 5 bits) |
| 1 U: | 4 bits | (or 5 bits) |
| 1 V: | 4 bits | (or 5 bits) |
| Total: | 24 bits | (or 30 bits) |

Applying the above pixel representation scheme achieves the following additional levels of compression as compared to traditional RGB color or YUV color palettes: (1) a 4:1 compression over conventional RGB (12 bytes, versus 3 bytes), or (2) a 2:1 compression over YUV 12 format (6 bytes, versus 3 bytes). Although the preferred embodiment described above contemplates fixed truncation, those skilled in the art will appreciate that variable truncation techniques are also available and are contemplated. In addition, although implementing the 5-bits per component representation yields an image of a better quality, it increases the number of bits required to be transferred. A reduction in the appearance of the video image once transmitted may inevitably occur.

II. DIGITAL IMAGE ENCODING/ COMPRESSION

Referring to FIG. 3, the presently preferred quad-tree motion analysis compression technique concentrates on differences between successive frames of the source image to further compress the video image. Consecutive frames are compared and analyzed to determine what changes 56 (FIG. 3(c)) have occurred in the current image 52 (FIG. 3(b)) with respect to a base image 54 (FIG. 3(a)). The locations of the changes and the corresponding changed information or data is then compressed and transmitted across the interface 14. Once received, the compressed image is rebuilt by the receiving system 50.

Figure 4:
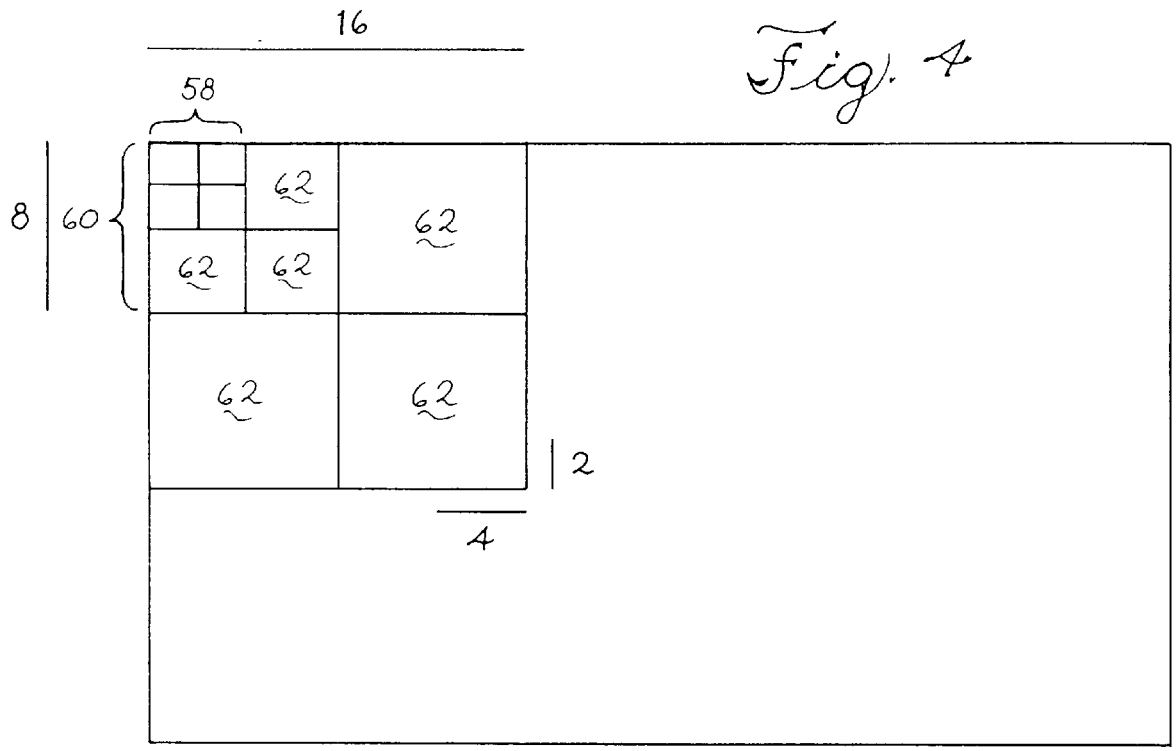
FIG. 4 graphically illustrates the division of blocks of an image according to the presently preferred quad-tree encoding technique.

The preferred quad-tree compression technique requires that the dimensions of the overall image be divisible by sixteen. Therefore, the 96×72 sampled image will be truncated to 96×64 pixels (16×6=96 columns; 16×4=64 rows) as described in detail above. This allows the image to be successively divided into four types of regions, as shown in FIG. 4. Each succeeding region is a subsection of the previous region. Ultimately, a 2×2 block 58 of pixels is obtained, which is the basic elemental unit used by the preferred quad-tree compression technique (2×2×2×2=16 pixels). Each primary region 60 contains three subregions 62. Each subregion 62 contains a further four subregions and so on. The last region ultimately contains four pixel blocks. These 2×2 pixel blocks 58 are used to compare the base image 54 to the current image 52.

The primary region 60 dimensions are limited to 16×16 pixels in the preferred embodiment because the overall image ranges are presently limited to 160×112 pixels and under. Using a larger primary region 60 would produce excessive data that ultimately may need to be transmitted. For example, with a 96×64 image, the next larger size for a primary region 60 that would mesh with the sixteen pixel dimensional constraint would be 32×32 pixels. This would allow for only six primary regions 60, however, in a 640× 480 pixel image. Thus, when change occurs within the image, all six primary regions 60 would most likely be marked as changed because a 32×32 pixel block represents a large portion of the overall image range. This would result in an undesirable increase in the amount of data and the amount of redundant information that is transmitted. With larger image sizes, such as a typical computer display screen image with dimensions of 640×480 pixels, however, either a primary region 60 size of 32×32 pixels, or even a size of 64×64 pixels, may be needed for optimal compression. As those skilled in the art appreciate, quad-tree compression could be applied to all possible image dimensions, and is thus contemplated without departing from the spirit and scope of the invention.

According to the preferred quad-tree compression technique, the first source image is stored as the base image 54. The base image 54 is then used to monitor changes throughout the video data stream. Each current image 52 is captured and compared to the base image 54 (see FIG. 3). The comparison is made by calculating the difference between each 2×2 pixel block 58 in the base image 54 and the current image 52. A 96×64 image contains one thousand, five hundred and thirty-six 2×2 pixel blocks 58 (6×4×4× 4'4=1536), and each block 58 in the current image 52 is compared against its counterpart block 58 in the base image 54.

A threshold is preferably employed to control the amount of change actually recorded. If the difference between the base image 2×2 pixel block and the current image 2×2 pixel block total exceeds the threshold, then change has been detected in a particular area of the base image. The comparison function can be expressed mathematically according to the following equation:

$$(p1+p2+p3+p4)_B - (p1+p2+p3+p4)_c > \text{THRESHOLD}$$

The value of the threshold determines the type or amount of detail that will be overlooked when comparing the two images. The higher the threshold, the more detail is ignored. Threshold values are thus chosen according to the requirements and features of the particular system. One presently preferred threshold level of four is employed with the preferred embodiment of the system 10.

If a pixel block change has been detected, the following steps are performed:

1. The x and y co-ordinates of the changed area are stored;
2. The pixel values for the current image 52 are stored in relation to the upper x and y co-ordinates of the base image 54; and
3. The old base image 54 pixel block 58 is replaced by the changes 56 detected in the current image 52 pixel block 58.

Once the entire current image has been analyzed, the base image 54 is updated. Updating the base image 54 with the changes 56 in the current image 52 helps prevent the progressive degradation of successive video images. When the next frame is compared, the changes that were previously overlooked because they did not meet the threshold will not influence the next set of changing pixel blocks 58. When the base image 54 is updated with the differences from each current image 52, therefore, succeeding frame comparisons and changes do not accumulate (i.e., are not added to the base image 54) causing the image to eventually degrade.

To begin transmission, the initial image (i.e., the first current image 52) is compared to a black image (i.e., the first base image 54). This allows for the base image 54 to be updated with the very first frame. According to the preferred embodiment of the invention, the entire base image 54 is then transmitted over the interface 14. Thus, the base image 54 at the encode side 12 is the same as the base image 54 at the decode side 16 of the interface 14. With the initial transmission of the base image 54, only changes to the base image need to be transmitted, thereby reducing significantly the amount of data that is compressed and communicated over the interface 14.

The Header File

Figure 5:
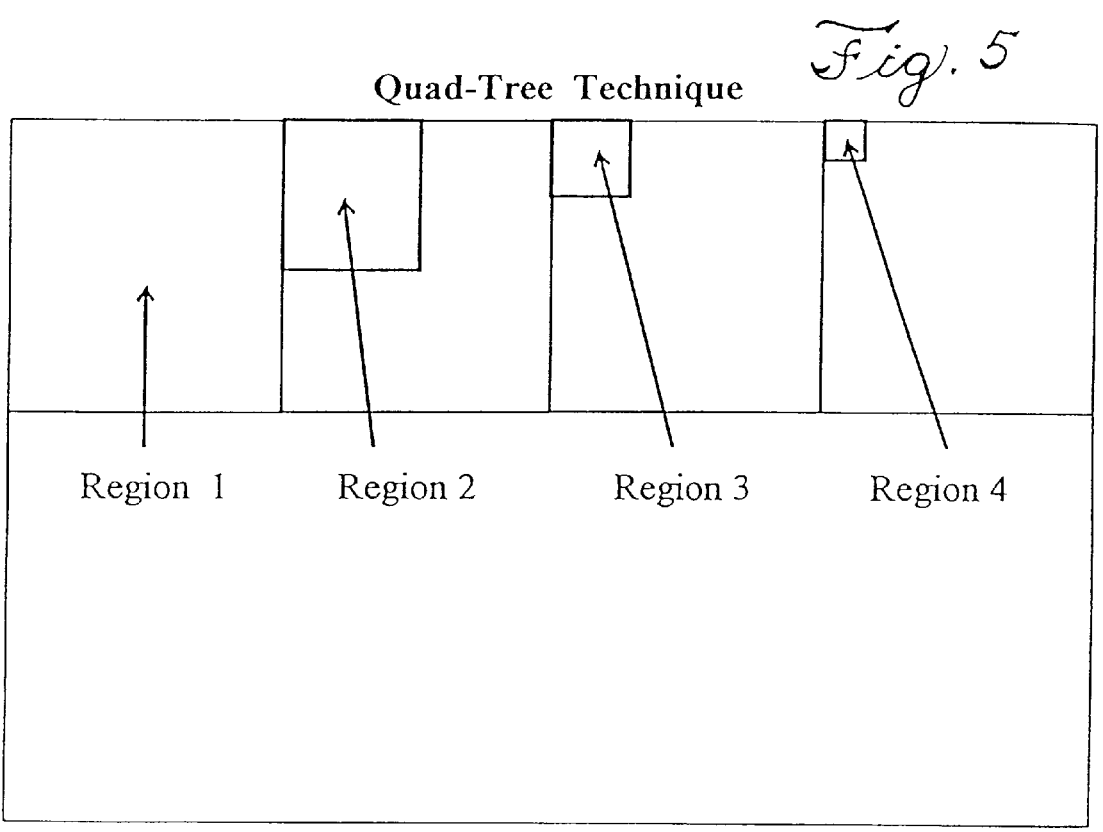
FIG. 5 identifies the various primary regions of the image as defined by the quad-tree technique shown in the FIG. 4.

In order to transmit the changes 56 to the base image 54, a header file is first created. Any changes to the base image 54 is communicated via the header file. The pixel block locations of changed data are encoded preferably using the four-tier hierarchical quad-tree encoding technique mentioned above (see FIG. 5). This technique produces the data that is represented in the header. The header preferably contains the locations for all the changes that occur between consecutive frames of image data. The header is preferably divided into four sections, as shown in FIG. 6. The first section contains information on the primary image regions 60. The remaining sections are sub-divisions 62 of the primary regions, and are referred to as "secondary regions" herein.

A binary structure is used to represent the primary regions 60, where each region 60 is represented by a single bit, as shown in FIG. 7. Setting a bit (e.g., "1" if on, "0" if off) represents that change has occurred in that particular region 60. The number of primary blocks is determined by the dimensions of the image. For example, the presently preferred 96×64 pixel image is divided into 24 primary regions 60. The primary regions 60 each have dimensions of 16×16 pixels. Three bytes or 24 bits are all that is needed to represent the 24 primary regions 60 and to indicate in which primary region 60 a change has occurred.

Below each primary region are three secondary regions 62. Each secondary region 62 has an identical structure. Because the secondary regions 62 are unrelated to the overall dimensions of the image, only to their preceding region, they are constant in size. The secondary regions 62 are also preferably represented in the header as a four-bit structure. This four-bit structure indicates which of the succeeding subregions 62 contains change. The final subregion 62 contains the 2×2 pixel blocks 58 described above.

After the locations of the differences between the base image 54 and the current image 52 are recorded, the x and y coordinates of the changes are also converted to a preferred coordinate system in order to further compress the data transmitted over the interface 14. First, the upper-left x and y coordinates of the 2×2 pixel block 58 are linked to the proper primary block. This is accomplished by determining which primary region 60 contains each set of coordinates. Referring to FIG. 7, once the primary region 60 is determined, the appropriate bit in the header file corresponding to that region is set. The x,y coordinate of each particular 2×2 pixel block 58 is further defined by dividing the primary region 60 into secondary regions 62. The secondary region 62 containing the changed pixel block is recorded. Further sub-divisions of the pixel block identifies the precise 2×2 pixel block 58 where a change has occurred. In the presently preferred coordinate system, therefore, the location of a changed pixel block 58 can be determined by following the positive paths of a three child or four node tree, as shown in FIG. 7. Each region is a node 64 in the tree 66, where the primary regions 60 act as numerous root nodes, and the secondary regions 62 are the child nodes in the tree. A positive path is where all the nodes in the path are marked as changed.

This process continues for all the pixel blocks marked as changed. With this process, the primary region 60 is completely coded in the header. The secondary regions 62 only appear in the header if a change occurs in a particular location in the image that corresponds to that region, as illustrated in FIG. 7. Therefore, the length of data representing the secondary regions 62 in the header depends on the type of change and the amount of change between image frames. The more localized the change, therefore, the more compressed the header becomes.

The order of the information contained in the header is very important. As discussed above, the header is sub-divided into regions. In the preferred embodiment, the primary regions 60 are presented in descending order in the header. Thus, the largest regions (primary regions 60) are encoded first, and the smallest regions (secondary regions 62) are encoded last. This order is necessary to ensure that the rebuild of the image on the decode side 16 of the interface 14 is correct and yields a correct and appealing image.

The primary regions 60 are conversely encoded in ascending order. From the primary region 60 encoding scheme, the order of the secondary regions 62 follows. The first region in the second section of the header thus corresponds to the first primary region 60 marked as changed. Accordingly, the first section of the header is completely decoded, and all primary regions 60 marked as changed are recorded, before the second section of the header is decoded. The first element in the second section is related to the first primary region 60 marked as changed. The second element is related to the second primary region marked as changed, and so forth (see FIG. 7). Once all the associations are completed between the first two sections of the header, the third section is decoded, and the first element of this section is related to the first element of the second section. This process continues until the all of the sections of the header file have been decoded and properly associated with the correct previous parent region.

After construction of the header is complete, the actual changed pixel blocks 58 in the current image are assigned to the header. In the presently preferred embodiment of the invention, the pixel blocks actually precede the header information. In the same manner that the subregions are packed into the header (FIG. 8(*a*)), the pixel blocks are also packed into the header (FIG. 8(*b*)). The pixel blocks 58 are packed in the same packing order as the last section of the header. When the header is decoded, and all the changed locations have been determined, the order in which each change is decoded is the same as the order in which the pixel values are packed. Because the final Section of the header contains the upper-left x,y coordinate location of the 2×2 changed pixel blocks 58 for the image, the pixel information that follows is grouped into packets of four pixels each (see FIGS. 7 and 8).

Before the header and packed pixel information is sent across the transmission medium 14, the lengths of these two entities must also be transmitted. The length of the header and the length of the packed pixels for the entire image precede the transmission of the actual header and pixel information. Sending these lengths is important because the compression technique allows for variation in the amount of motion detected and encoded between each frame. Thus, if the exact amount of information for each header and pixel stream is not extracted and communicated to the receiving systems 50, the entire process can become corrupted beyond recovery.

Optimizing, Filtering and Encoding

As in most live video compression techniques, the smaller the degree of change in consecutive frames, the greater the compression ratio. For the preferred quad-tree compression technique to reach optimal performance, important change has to be distinguished from merely environmental change. The term "environmental" change is used herein to mean differences between consecutive frames caused by one or more of the following: (a) camera signal noise, (b) grain shifting, or (c) minor light fluctuations that cause noise variations in shading edges. The term "shading edges" applies to smooth shading change in an object within the image.

As those skilled in the art will appreciate, live video image capturing produces environmental change or artifacts between consecutive image frames. The fluctuations in the stability of the environment can dramatically hamper the performance of any compression technique. These changes also interfere with the consistency of the environment, creating a constant stream of inconsequential change. When quality of the image is crucial, detecting minor changes in the image is critical. Continuous environmental change can saturate the compression process and reduce the quality of full-motion video. The successive images should be regulated to ensure that only pertinent information is encoded and transmitted. By regulating the images, the amount of data needed to transmit and update the base image 54 is reduced and the environment of the image is stabilized, thus yielding a higher quality image.

In the presently preferred embodiment of the invention, an image filtering technique is implemented to regulate the changes in the image. The filters remove fluctuation along shaded border regions, and help stabilize border movement (see FIGS. 9(*a*) and 9(*b*)). The preferred pixel filtering technique scans each image both horizontally and vertically. A one dimensional mask is used to compare each pixel value with the surrounding pixel values. If the pixel value at the center of the filter has a difference of one from the surrounding pixels, then the value of the center pixel is replaced by the surrounding pixel value. To retain maximum image quality, the surrounding pixels should all be equal before the center pixel is replaced. Either a three-pixel or five-pixel length mask can be used. A five-pixel length mask retains more detail. A three-pixel length mask removes more ambiguities, thus rendering the image environment more stable. The three-pixel mask also decreases the amount of information that needs to be encoded and transmitted.

The above filtering technique is implemented once on the first base image 54, and then on each consecutive current image 52, and is also performed before the consecutive frames are compared. When comparing consecutive frames, therefore, the variations in shading borders and noise will be reduced (see FIGS. 9(*a*) and 9(*b*)), thereby allowing the quad-tree compression technique to compress only crucial changes to the image while ignoring most environmental changes.

As described above, image comparisons consist of analyzing the intensity information. The color components are ignored because these components remain fairly consistent when motion occurs between consecutive frames, while the intensity value changes correspond to the motion in the image. Thus, when intensity differences are observed between consecutive images, motion has occurred. When encoding the pixel information, the intensities are encoded separately. These intensities are packed in a manner corresponding to the order of the unpacked header. The U and V color components, therefore, are compressed as separate entities. Due to the inherent consistency of the U and V color components, for further compression, the U and V values corresponding to the intensity pixel blocks of change can be ignored every other frame. Thus, the color information (U and V components) only has to be sent every second frame, which further reduces the digital data sent over the interface 14.

Also, only the U and V color components associated with changing intensities (Y) are encoded. The color components thus occupy one half of the intensity information in their uncompressed state. Due to the consistency of the U and V color components, a simple run-length encoding scheme produces high compression in the preferred embodiment when these components are coded as separate entities. To further save on the amount of transmitted data, the lengths of the compressed U and V color components are preferably not included. These compressed streams are decompressed using one quarter of the decompressed intensity length. As those skilled in the art will appreciate, other encoding schemes can also be employed without departing from the spirit and scope of the invention, and are therefore contemplated herein. An alternate encoding technique can include, for example, Huffman encoding.

For the truncated 4-bit intensities described above, a run-length compression scheme is used. The intensities are processed through a Run Length Encoder and then compared to the original intensity length. If the run-length is less than the original intensity length, the header is marked to indicate that the intensities are run-length encoded. For the alternate 5-bit truncated intensities, a difference-based Huffman encoder is used. The standard Huffman encoder is used to encode the first intensity value, but only the difference between each consecutive intensity is encoded. The same principle for comparison and indication described above for run-length encoding is applied to the intensity stream encoded by the Huffman technique.

III. IMAGE TRANSMISSION

The successful transmission of full-motion depends on being able to utilize the full bandwidth of the transmission system 10. This means the memory buffers 30 must be kept full (or very nearly full) at all times, which in turn requires data to be sent from the computer 26 to the transmission interface 14 faster than the interface 14 can send the data to the receiving system 50. These transmissions preferably take place over the serial I/O port (not shown) of the computer 26.

Standard PC-compatible serial port BIOS routines do not typically provide for such fast serial communications. The fastest commercially available modems 24 are capable of communicating at line rates of 33,600 bps (ITU V.34 protocol), as described above, while ISDN links are twice as fast. By means of hardware signaling (RTS/CTS) and internal buffering, modern modems are capable of operating with the DTE (Data Terminal Equipment) rate locked well above the actual DCE (Data Communication Equipment) rate. In the case of V.34 links, therefore, the DTE rate can be locked at 115,200 bps or above without any loss of data provided the application software is compatible with this locked rate. Standard serial BIOS routines, however, are not capable of performing such a task.

Even if the typical BIOS routines were capable of such DTE rates, another significant problem exists to impede fast RS-232 communications. Standard BIOS routines do not provide a mechanism to keep data constantly flowing to the transmission interface 14 without constant intervention by the application software. To keep this data flow transparent to the application, therefore, some mechanism for serial block transfers of data is essential.

Several solutions exist to overcome these deficiencies. At a minimum, a simple replacement of the existing BIOS routines with an installable device driver may suffice. Several such drivers, called "FOSSIL" drivers, (standing for "Fido-Opus-SEADog Standard Interface Layer") are known in the art. However, with the exception of a driver written for the OS/2 operating system, these drivers exist as 16-bit code. There are many reasons to support 32-bit code, for full-motion video transmission. The most apparent reason is that the preferred Meteor capture card 22 operates in a 32-bit environment. Modern operating systems, such as Windows NT, also run in 32-bit environments. Even within the DOS environment, most of the hardware currently in use is suited to 32-bit operation. For these reasons, a 32-bit environment is preferred.

Because of the inherent high bandwidth required for full-motion video transmission, it is necessary to control the transmission of the bit stream over the interface 14 at the lowest possible level. The DOS operating system allows direct hardware access at this level and is thus preferred. Because DOS is a 16-bit operating system, however, it is necessary to develop a 32-bit to 16-bit interface to use the serial device drivers described above in a DOS environment. One presently preferred software interface, which is compiled using the Watcom C version 10.6 compiler, is included in the microfiche appendix.

In the DOS operating system it is a relatively easy task to install custom communication routines. In a multi-tasking operating system, however, it is more difficult to write device drivers. Alternatively, commercially available drivers may be obtainable from third-party sources. For example, the multiple-port DIGIBoard family of serial communications cards, manufactured by Compaq Computer Corp. of Dallas, Tex., is sold with device drivers that can interface with multiuser, multi-tasking systems, and is available as an alternative embodiment.

Modem Setup and Initialization

As those skilled in the art appreciate, either asynchronous or synchronous serial transmission can take place over the interface 14. Because serial ports are usually asynchronous, and because the transmission is highly irregular, asynchronous serial communication is preferred. The fundamental sequence of bits moving through the serial port (not shown) is: 1 start bit, 8 data bits, an optional parity bit, and 1 or 2 stop bits. The configuration of most serial ports is tied to the RS-232 standard.

Two methods are available for transmission of the video bit stream: byte and block transmission. In byte transmission one byte is sent at a time. In block transmission, an entire block of data is sent at one time. Block transmission thus frees the processor to perform other tasks during the transmission. Block transmission is employed in the preferred embodiment of the invention. Those skilled in the art will appreciate, however, that byte transmission can also be employed without departing from the spirit and scope of the invention.

The X00 Communication Protocol

The X00 communication protocol is preferably employed to provide the high level functions needed to communicate over the interface 14, and is generally known in the art. The X00 protocol is a Serial Input/Output (SIO) communications driver. It provides an interface between an application program and the serial communications hardware. The X00 protocol meets the FOSSIL level 5 specification. The X00 program is preferably implemented as a TSR rather then a device driver, and is loaded in the "config.sys" file for faster operation. The X00 protocol also allows for locked communications, which is preferred. With the presently preferred quad-tree compression technique, as each single block is compressed, it is transferred to the X00 outbound buffer, which eventually will transfer the byte in interrupt mode to the RS-232 communication port.

IV. IMAGE RECONSTRUCTION

Once the current image 52 data is transmitted over the interface 14 and is received on the decode side 16, the image is reconstructed preferably for display on a display device 20 (see FIG. 1(a)). In order to reconstruct the image, the transmitted truncated pixel information is restored from 3-bytes (24 bits) to 6-bytes (48 bits) by filling the erased bits with zeros. The result obtained on the receive side of the interface 14 is in the YUV 12 Format pixel representation, as shown in Table B:

TABLE B

| a | b |
|---|---|
| c | d |

In Table B, the individual pixels consist of the following information:

a: Ya, U1, V1 b: Yb, (U1+U2)/2, (V1+V2)/2 c: Yc, (U1+U3)/2, (V1+V3)/2 d: Yd, (U1+U4)/2, (V1+V4)/2

Where:

Block 1: Ys (Ya, Yb, Yc, Yd), U1, V1

Block 2: Ys, U2, V2

Block 3: Ys, U3, V3

Block 4: Ys, U4, V4

Figure 10:
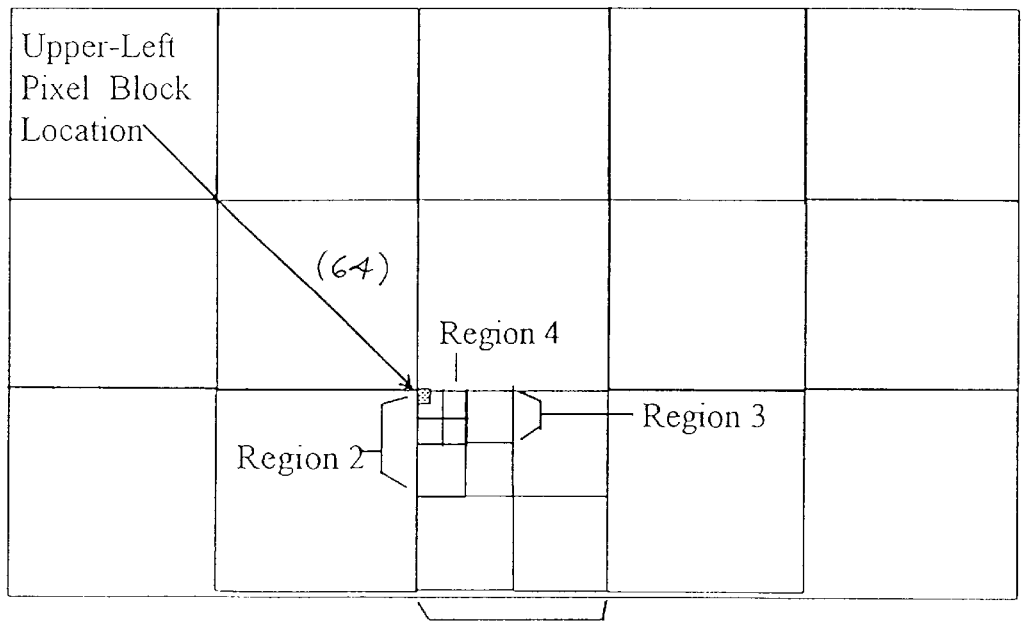
FIG. 10 illustrates the presently preferred decoded header of changed data encoded by the preferred quad-tree encoding technique shown in FIG. 4.

To paint the image on the display device 20, the process begins with the top left pixel and displays those values defined by the above equations. For the top left pixel labeled "a", its Y component is displayed along with the U and V components of the entire 2×2 pixel block 58. For the top right pixel labeled "b", its Y component is displayed, and the average between the U and V components for blocks 1 and 2 is displayed. For the bottom left pixel labeled "c", its Y component is displayed, and the average between the U and V components for blocks 1 and 3 is displayed. Finally, for the bottom right pixel labeled "d", its Y component is displayed along with the average between the U and V components for blocks 1 and 4. In this manner, each pixel has its own unique Y component as well as its own U and V components. The image thus does not appear "splotchy" (e.g. have blocks of colors) and is displayed in an aesthetically appealing manner Decoding the Image The header and packed intensity values are decoded by the receiving system 50. The reverse of the process used to encode the header is used to decode the header. Referring to FIG. 10, the header is first decoded in ascending order. The first section of the header (i.e., primary region 60) is decoded first. All primary regions 60 marked as changed are recorded. The next section of the header corresponds to the first section that possesses regions marked as changed. This process continues until the final section is decoded. Once the header is completely decoded, the header coordinate system is converted into an x,y coordinate system. This is completed by combining all the regional information together to formulate an upper-left pixel block location 64, as shown in FIG. 10.

Figures 11A, 11B, 11C:
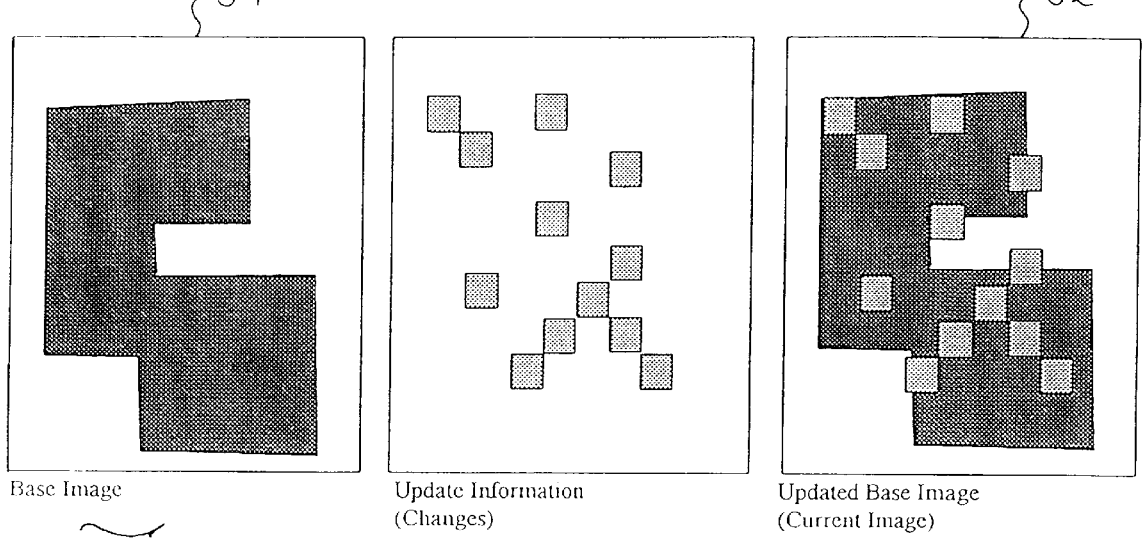
FIG. 11(b) shows the area of change in the current image, and FIG. 11(c) identifies the updated base image reflecting the changed areas.

After all the x,y coordinates have been recovered from the header, the pixel information is unpacked. Each 2×2 pixel block 58 is related to a single x,y coordinate. The order of the pixel blocks is the same as the order of the x,y coordinate system, i.e., in ascending order. As each pixel block is unpacked, the information it contains is written to the base image 54 stored at the decode side 16 (the base image 54 is equivalent at both transmitter and receiver). The packed pixel information contains the data required to convert the base image 54 to the next current image 52 on the decode side 16. Referring to FIGS. 11(a)–(c), once all the packed pixel information is written to the base image 54, the base image 54 becomes the current image 52. When the next set of header information and pixel information arrives, the current image 52 becomes the base image 54, and the process repeats.

Proportional Dithering

Following the completion of the updated base image 54, the image is preferably processed for further quality enhancement. Shaded border regions around the image are smoothed and random pixel anomalies are removed from the image. The purpose of cleaning the image is to optimize a proportional dither routine (described below), which expands the intensity range in the image. The same pixel filter technique used when comparing the base image 54 to the current image 52 is used to justify the shading borders and to remove random pixel noise located around the shading boundaries.

A two-dimensional filter is preferably applied to remove dramatic single pixel differences occurring within the image. The two-dimensional filter is preferably 3×3 pixels in size. The center of the filter is aligned with the image and is compared to the surrounding region of the image. If the surrounding region is constant and the center deviates from the mean of the region, then the center pixel is appropriately adjusted. This adjustment consists of blending the pixel extremity with its surround pixel neighbors. This allows the proportional dither routine to optimize the gradual shading within regions in the image.

The proportional dithering routine is then applied to increase the intensity range of the image, as shown in FIGS. 12(a) and 12(b). For example, a 4-bit intensity image can be converted into a 5-bit intensity or even a 6-bit intensity image. This process involves both a horizontal and vertical pass through the entire image. First, the intensity values are doubled, allowing for a middle intensity range to be inserted if necessary. Intensities ranging from 0, 1, 2, . . . , 15 thus range from 0, 2, 4, . . . , 30. Second, the image is passed vertically. As shown in FIG. 13, the intensity information is stored, along with the length (L1), if the intensity (I1) is constant. Third, the next intensity value (I2) is recorded. If this intensity is either two greater than or two less than the previous intensity (I1), the length (L2) of that intensity is also recorded. Fourth, a proportional subsection of each of the two intensity lengths is removed, and the middle intensity (M=(I1+I2)/2) is inserted. The proportional length is determined by taking each length (L1, L2) shown in FIG. 13 and using the following equations:

P1=(L1/4)+1

P2=(L2/4)+1

Each of the proportional lengths (P1, P2) is subtracted from the corresponding intensity lengths (L1, L2). Next, the middle intensity (M) is inserted between the two intensity values (I1, I2). The first intensity thus has a length of L1−P1, the middle intensity has a length of P1+P2, and the third intensity has a length of L2−P2. This process continues vertically for the entire image. The same process is then used for the horizontal proportional dither.

The dithering process improves the quality of the image by smoothing the background intensities. The presently preferred proportional dithering routine also ensures that two intensity values with drastic differences will not be proportionally blended. Preferably, only shading areas are blended, while contrasting edges remain constant.

V. COMPUTER PROGRAM OPERATION

Figure 14A:
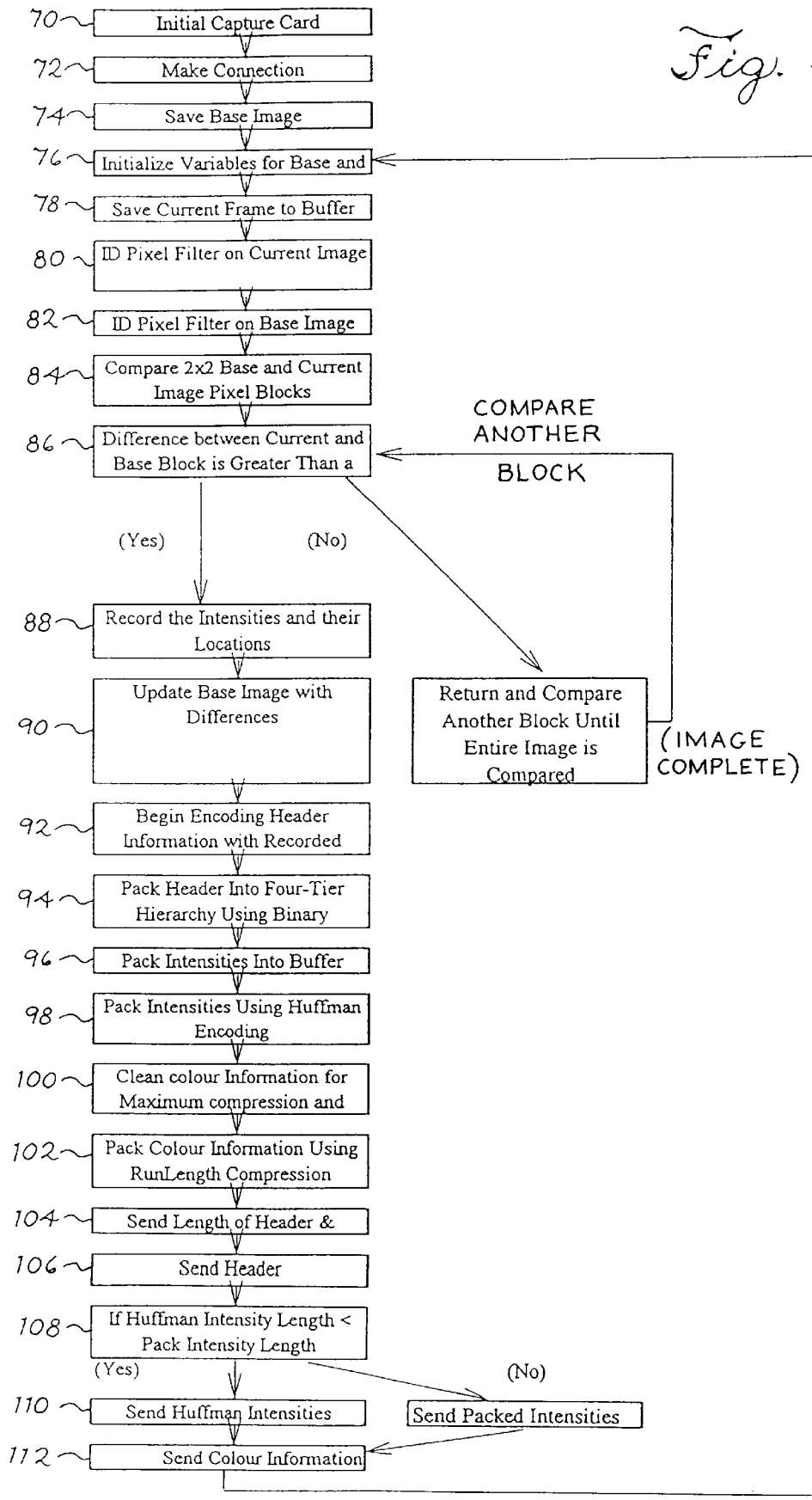
FIG. 14(a) shows the flow of the encoder routines.
Figure 14B:
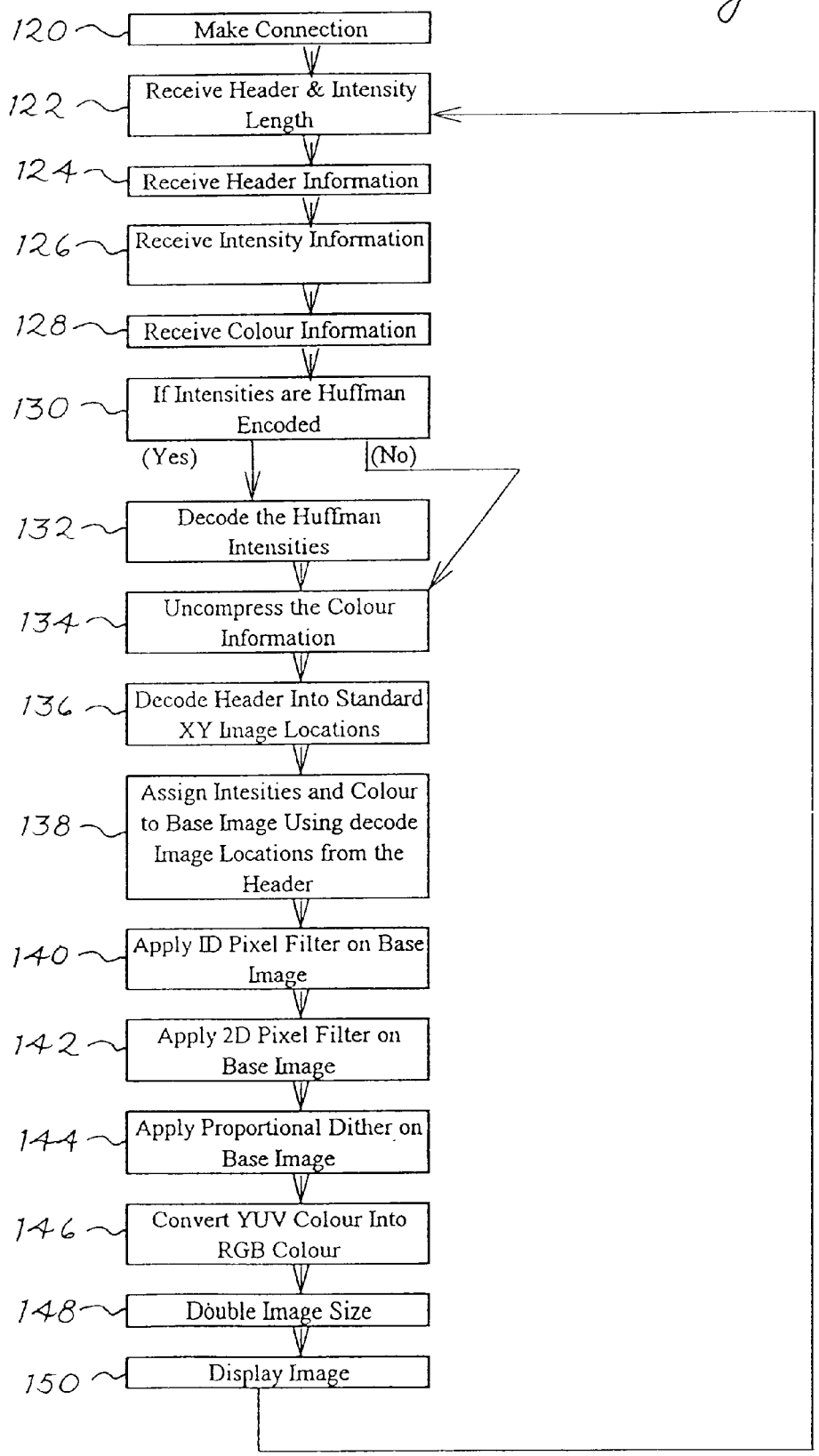
FIG. 14(b) shows the flow of the decoder routines.

Referring to FIGS. 14(a) and 14(b), a flow chart of the presently preferred computer program included in the microfiche appendix is illustrated. The preferred computer program includes operations for both the encode side 12 and the decode side 16 of the interface 14. Accordingly, FIG. 14(a) identifies the sequence of steps performed by the preferred computer program on the encode side 12; and FIG. 14(b)

identifies the operations performed by the computer program on the decode side 16.

Referring first to FIG. 14(*a*), on the encode side 12 the computer program initializes the image dimensions, YUV format, buffers, and any capture card specific routines at step 70. At step 72, I/O ports are initialized and the modem 24 communication protocol is initiated. At step 74, the first base image is stored in a buffer, and all variables are cleared for the compression routine at step 76. The current image is stored in the capture card buffer at step 78 to be compared against the base image. At steps 80 and 82 a one dimensional filter is applied to the current and base images, respectively, to remove noise and improve compression.

At step 84, the program proceeds to calculate the difference between the 2×2 pixel blocks in the base image and the current image. A check to determine if the difference between the pixel blocks is greater then the predetermined threshold is performed at step 86. At step 88, the location of the pixel block and its contents is recorded if the threshold is exceeded. At step 90, the old base image pixel block is replaced with the current image pixel block, and the program continues comparing pixel blocks until the entire image has been analyzed.

At step 92, the program begins converting the recorded pixel blocks different locations into the preferred quad-tree location format described above. The quad-tree locations are packed into the header if a change is detected at step 94 until all four levels of encoding are completed. The intensity pixel blocks are packed into a buffer at step 96, and the length of the buffer is recorded. A Huffman compression algorithm is implemented at step 98 to compress the intensity of the pixel blocks, and the length of the Huffman buffer is recorded.

Any color anamolies are removed from both the U and V components of the image at step 100, and at step 102 the U and V components are compressed using Run Length compression. At step 104 the lengths of the header, intensities, and U and V components are sent to a buffer, and at step 106 the header information is communicated across the transmission interface 14.

Upon receipt of the length of the Huffman intensity and the packed pixel intensity, these values are compared at step 108 and the shortest length value for the intensity is transmitted at step 110. To complete the flow of the transmitter or encoder routines, the Run Length encoded values for the U and V components are transmitted at step 112, and the program loops back to capture and process the next current image.

In FIG. 14(*b*), the flow of the decoder routines is illustrated. After establishing a connection with the transmission system at step 120, the process proceeds to receive the header and intensity length at step 122, receive the header information at step 124, receive the intensity information at step 126, and receive the color information at step 128. The color information is in the form of U and V components transmitted as described above. A test is made at step 130 to determine if the intensities are Huffman encoded or packed pixels. If Huffman encoding was employed, the Huffman intensities are decoded at step 132. The results of the decompression convert the Huffman information into standard pixel intensity information. Program flow proceeds to step 134 where the U and V components are decompressed from their Run Length encoding. If Huffman encoding was not detected at step 130, program flow proceeds directly to step 134. Preferably, one quarter of the length of the intensities is used as a guide for decompressing the U and V components at step 134.

At step 136, the header is decoded on a level-by-level manner into standard x,y image locations. Once all four levels of the header have been decoded, the information from these levels is combined to create the x,y image locations. The image locations from the header are used at step 138 to update the base image with the current acquired intensity color information. Once all the locations decoded from the header have been updated, the base image has been successfully converted to the current image.

The program flow then proceeds to clean up the image by applying a one-dimensional image filter at step 140 to clean shading boundaries, and applying a two-dimensional image filter at step 142 to remove single intensity fluctuations within the image. The proportional dither routine is applied to the base image at step 144. After the proportional dither routine, the YUV image is converted at step 146 into a traditional RGB color image. As those skilled in the art will appreciate, the RGB color image can be used for display purposes. At step 148, the dimension of the image is doubled using a pixel averaging technique, and the image is displayed on the display screen at step 150. The decoder or receiver routines then loop back to step 122 to receive information for the next frame update.

According to the above description, many steps are performed in successive stages to reduce a video image to a size suitable for full-motion video transmission. Several new palettes were developed that preserve the color spatial information, while cutting the bits per pixel to a minimum of one fourth (¼) its size. This produces a 75% decrease in picture size. By further eliminating parts of the picture (page) and then reconstructing it with mathematical equations, additional decreases in the information per page are achievable. A unique sampling method is employed that decreases the information of a picture (page) by approximately one fourth (¼). The combination of these two methods together successfully reduces the pictorial information by 93.75%. The new size of information required to transfer is reduced from 663,552 bits per frame, down to 41,472 bits per frame (96×72×6) or, in other words, down to 6.25% of the original size (192×144×24). At that stage, a transfer of 0.78 pages per second is possible. Further reduction of the image is accomplished through the quad-tree compression technique to reduce the size of the image to the point where 30 pages can be transmitted per second thus producing full-motion video on the other end of the transmission interface.

It is to be understood that a wide range of changes and modifications to the embodiments described above will be apparent to those skilled in the art, and are also contemplated. It is therefore intended that the foregoing detailed description be regarded as illustrative rather then limiting, and that it be understood that it is the following claims, including all equivalents, that are intended to define the spirit and scope of the invention.

We claim:

1. A method of encoding and compressing digital data comprising the steps of:

representing an image as a group of pixels, each pixel expressed in a truncated format;

dividing the group of pixels into elemental blocks of pixels suitable for compression;

storing a base image representing a reference for comparison of successive images to detect change in the successive images;

encoding changes from the base image by storing the location of any change and the value of changed data, the location of any change being stored in a header file;

compressing the stored header file and changed data using a quad-tree format;

generating a signal representing the compressed header file and changed data;

receiving the compressed header file and changed data:

decompressing the compressed header file and changed data;

decoding the changes from the base image;

applying a proportional dither routine to smooth background intensities in the changed image; and restoring the changed image based on the location of any change and the value of changed data.

2. The method defined in claim 1, wherein the elemental block of pixels comprises two-by-two matrices of pixels.

3. The method defined in claim 1, wherein the truncated pixel format comprises a truncated YUV pixel representation format.

4. The method defined in claim 1, further comprising the step of filtering the image prior to compression in order to regulate changes in the image.

5. The method defined in claim 1, wherein the step of generating a signal further comprises transmitting the compressed header file and changed data over a communication medium.

6. The method defined in claim 5, wherein the communication medium comprises an analog telephone line.

7. The method defined in claim 1, further comprising the step of filtering the changed image to remove any background noise.

8. The method of claim 1 wherein applying a proportional dither routine comprises:

locating intensity regions in the changed image with a unit intensity difference; and inserting a proportionally sized region of intermediate intensity in place of portions of the intensity regions.

9. The method of claim 8 further comprising:

increasing intensity values in the changed image;

storing an intensity value and associated intensity length for adjacent intensity regions;

determining proportional lengths for intensity substitution in the adjacent intensity regions; and modifying intensity values along the proportional lengths to intermediate intensity values.

10. A method of encoding and decoding successive digital data comprising the steps of:

capturing successive digital data fields;

denoting the most recent data field as current data and the previous data field as base data;

dividing both the base data and current data into blocks of data representing groups of individual data elements;

assigning in a header file a location to each block of data and digitally representing the data within each block;

successively comparing the current data in each block of data to the base data in a corresponding block of data to determine if there are any differences;

identifying the location in the current data that is different from the base data and encoding the location of the changed data in a quad-tree format;

compressing the changed data;

transmitting the locations of all of the changed blocks of data;

transmitting the data for all changed blocks of data;

receiving the transmitted locations of all of the changed blocks of data;

receiving the transmitted data for all of the changed blocks of data;

replacing the block of data in the base frame at those locations corresponding to the changed blocks of data with the received block of data for the corresponding pixel block locations;

filtering the received block of data to regulate any changes in the data;

applying a proportional dither routine to smooth the background intensities of the received block of data; and generating a signal representing the received block of data.

11. The method of claim 10 wherein applying a proportional dither routine comprises:

doubling intensity values;

locating adjacent intensity regions having intensity values differing by two or less;

removing a proportional section of a length of each adjacent intensity region; and inserting a replacement region of middle intensity in place of the proportional section.

12. The method of claim 11 wherein the proportional dither routine is applied along a vertical pass and a horizontal pass of the received block of data.

13. A method of encoding and decoding successive digital data comprising the steps of:

capturing and storing successive digital data fields in a first memory;

storing the most recent data field in a current data buffer and the previous data field in a base data buffer, the current and base data buffers disposed in the first memory;

dividing both the base data and current data into blocks of data representing groups of individual data elements;

assigning in a header file a location to each block of data and digitally representing the data within each block;

successively comparing the data in the current data buffer to the data in the base data buffer to determine if there are any differences;

identifying the location of any difference between the data in the current and base data buffers, and encoding the location of the changed data in a quad-tree format;

compressing the changed data;

transmitting the encoded locations of the changed blocks of data;

transmitting the compressed data for all changed blocks of data;

receiving the transmitted encoded locations of the changed blocks of data in a second memory;

receiving the transmitted compressed data for all changed blocks of data in the second memory;

filtering the received data to remove any background noise;

replacing the previously received transmitted data at those locations corresponding to the changed blocks of data with the currently received block of data for the corresponding pixel block locations; and applying a proportional dither routine to smooth background intensities of the received data.

14. The method of claim 13 wherein applying a proportional dither routine comprises:

doubling intensity values;

locating adjacent intensity regions having intensity values differing by two or less;

removing a proportional section of a length of each adjacent intensity region; and inserting a replacement region of middle intensity in place of the proportional section.

15. A system for encoding and compressing digital data comprising:

an input to receive an image as a group of pixels, each pixel expressed in a truncated format;

means for dividing the group of pixels into elemental blocks of pixels suitable for compression;

a memory operative to store a base image representing a reference for comparison of successive images to detect change in the successive images;

means for encoding changes in a changed image from the base image by storing the location of any change and the value of changed data in a header file, the header file disposed in the memory;

a first processor coupled to the memory, the processor operative to compress the stored header file and changed data using a quad-tree format;

means for generating a signal representing the compressed header file and changed data;

a receiver coupled to receive the compressed header file and changed data;

a second processor operative to decompress the compressed header file and changed data;

means for decoding the changes from the base image;

means for restoring the changed image based on the location of any change and the value of changed data; and means for applying a proportional dither routine to smooth background intensities in the changed image.

16. The system defined in claim 15, wherein the elemental block of pixels comprises two-by-two matrices of pixels.

17. The system defined in claim 15, wherein the truncated pixel format comprises a truncated YUV pixel representation format.

18. The system defined in claim 15, further comprising means for filtering the image prior to compression in order to regulate changes in the image.

19. The system defined in claim 15, further comprising an output coupled to the processor, the output operative to transmit the compressed header file and changed data over a communication medium.

20. The system defined in claim 19, wherein the communication medium comprises an analog telephone line.

21. The system defined in claim 15, further comprising means for filtering the changed image to remove any background noise.

22. The system of claim 15 wherein the means for applying a proportional dither routine comprises:

means for locating intensity regions in the changed image with a unit intensity difference; and means for inserting a proportionally sized region of intermediate intensity in place of portions of the intensity regions.

23. A system for encoding and decoding successive digital data comprising:

a first input coupled to capture successive digital data fields;

means for denoting the most recent data field as current data and the previous data field as base data;

means for dividing both the base data and current data into blocks of data representing groups of individual data elements;

a first memory coupled to the first input, the first memory operative to assign in a header file a location to each block of data and digitally representing the data within each block;

a processor coupled to the first memory, the processor operative to successively compare the current data in each block of data to the base data in a corresponding block of data to determine if there are any differences;

means for identifying the location in the current data that is different from the base data and encoding the location of the changed data in a quad-tree format;

means for compressing the changed data;

an output coupled to the processor, the output to transmit the locations of all of the changed blocks of data and the data for all changed blocks of data;

a second input coupled to receive the transmitted locations of all of the changed blocks of data and the transmitted data for all of the changed blocks of data;

a second memory coupled to the second input, the second memory operative to replace the block of data in the base frame at those locations corresponding to the changed blocks of data with the received block of data for the corresponding pixel block locations;

means for filtering the received block of data to regulate any changes in the data;

means for applying a proportional dither routine to smooth the background intensities of the received block of data; including means for locating intensity regions having a unit intensity difference; and means for inserting a proportionally sized region of intermediate intensity in place of portions of the intensity regions; and a signal output from the memory, the signal representing the received block of data.

24. A system for encoding and decoding successive digital data comprising:

means for capturing and storing successive digital data fields in a first memory;

means for storing the most recent data field in a current data buffer and the previous data field in a base data buffer, the current and base data buffers disposed in the first memory;

means for dividing both the base data and current data into blocks of data representing groups of individual data elements;

means for assigning in a header file a location to each block of data and digitally representing the data within each block;

means for successively comparing the data in the current data buffer to the data in the base data buffer to determine if there are any differences;

means for identifying the location of any difference between the data in the current and base data buffers, and encoding the location of the changed data in a quad-tree format;

means for compressing the changed data;

means for transmitting the encoded locations of the changed blocks of data;

means for transmitting the compressed data for all changed blocks of data;

means for receiving the transmitted encoded locations of the changed blocks of data in a second memory;

means for receiving the transmitted compressed data for all changed blocks of data in the second memory;

means for filtering the received data to remove any background noise;

means for applying a proportional dither routine to smooth background intensities of the received data; including means for locating intensity regions having a unit intensity difference; and means for inserting a proportionally sized region of intermediate intensity in place of portions of the intensity regions; and means for replacing the previously received transmitted data at those locations corresponding to the changed blocks of data with the currently received block of data for the corresponding pixel block locations.

25. A method for decoding compressed digital data, the method comprising:

receiving a compressed header file including encoded data representative of location of changes from a base image and changed data;

decompressing the compressed header file;

decoding the changes from the base image;

restoring a changed image based on the location of any change and the value of changed data; and applying a proportional dither routine to smooth background intensities in the changed image; including locating intensity regions in the changed image with a unit intensity difference; and inserting a proportionally sized region of intermediate intensity in place of portions of the intensity regions.

26. A system for decoding compressed digital data, the method comprising:

a receiver configured to receive a compressed header file, the header file including encoded data representative of location of changes from a base image and changed data;

a processor operative to decompress the compressed header file;

means for decoding the changes from the base image;

means for restoring a changed image based on the location of any change and the value of changed data; and means for applying a proportional dither routine to smooth background intensities in the changed image; including means for locating intensity regions in the changed image with a unit intensity difference; and means for inserting a proportionally sized region of intermediate intensity in place of portions of the intensity regions.

\* \* \* \* \*